(12) United States Patent
Lang et al.

(10) Patent No.: US 9,140,398 B2
(45) Date of Patent: Sep. 22, 2015

(54) AIR ASPIRATION DEVICE

(75) Inventors: John Lang, Inver Grove Heights, MN (US); Mark Mohr, Lindstrom, MN (US); Colin Jaedike, Shoreview, MN (US)

(73) Assignee: Pentair Flow Technologies, LLC, Delavan, WI (US)

( * ) Notice: Subject to any disclaimer, the term of this patent is extended or adjusted under 35 U.S.C. 154(b) by 449 days.

(21) Appl. No.: 13/079,755

(22) Filed: Apr. 4, 2011

(65) Prior Publication Data

US 2011/0240143 A1    Oct. 6, 2011

Related U.S. Application Data

(60) Provisional application No. 61/320,464, filed on Apr. 2, 2010.

(51) Int. Cl.
| | |
|---|---|
| *B05B 1/20* | (2006.01) |
| *F16L 55/11* | (2006.01) |
| *B01F 5/04* | (2006.01) |
| *B05B 1/16* | (2006.01) |
| *B05B 15/06* | (2006.01) |

(52) U.S. Cl.
CPC ........... *F16L 55/1108* (2013.01); *B05B 1/1645* (2013.01); *B05B 15/069* (2013.01); *Y10T 137/6851* (2015.04); *Y10T 137/85938* (2015.04)

(58) Field of Classification Search
CPC .. F16L 55/1108; B05B 15/069; B05B 1/1645
USPC ........... 239/159–170; 137/888; 285/197–199, 285/252, 253, 420

See application file for complete search history.

(56) References Cited

U.S. PATENT DOCUMENTS

| | | | |
|---|---|---|---|
| 1,205,131 A * | 11/1916 | Beck | 285/303 |
| 1,747,630 A | 2/1930 | Hardi | |
| 2,541,208 A * | 2/1951 | Cornelius | 285/133.4 |
| 2,755,106 A | 7/1956 | Brennan et al. | |
| 3,288,371 A | 11/1966 | Broughton | |
| 3,684,177 A | 8/1972 | Barlow | |
| 4,372,171 A | 2/1983 | Brandt, Jr. | |
| D287,992 S | 1/1987 | McLennan et al. | |
| 4,639,020 A * | 1/1987 | Rung et al. | 285/367 |
| D288,116 S | 2/1987 | McLennan et al. | |
| 4,704,983 A | 11/1987 | Rung | |
| 4,709,857 A | 12/1987 | Wilger | |
| 4,715,467 A | 12/1987 | Sakai | |
| 4,915,304 A | 4/1990 | Campani | |
| 4,915,305 A | 4/1990 | O'Brien et al. | |

(Continued)

FOREIGN PATENT DOCUMENTS

| | | |
|---|---|---|
| AU | 709685 | 5/1997 |
| AU | 736004 | 7/2001 |

(Continued)

*Primary Examiner* — Craig Schneider
*Assistant Examiner* — Josephine Trinidad-Borges
(74) *Attorney, Agent, or Firm* — Quarles & Brady LLP

(57) ABSTRACT

Embodiments of the invention provide an air aspiration device to release trapped air in a pipe containing a solution that is to be delivered to a nozzle body. The air aspiration device can include an air port in fluid communication with the air and the solution, an exit port, and a passageway in fluid communication with the air port and the exit port. The air aspiration device can also include a main body and a female pipe fitting forming an end cap for one end of the pipe.

34 Claims, 24 Drawing Sheets

(56) References Cited

U.S. PATENT DOCUMENTS

| | | |
|---|---|---|
| 4,927,080 A | 5/1990 | Alsing |
| 4,986,473 A | 1/1991 | Semple et al. |
| 5,031,755 A * | 7/1991 | Blakeley ............ 285/112 |
| 5,168,872 A | 12/1992 | Rasmussen et al. |
| 5,169,177 A | 12/1992 | McLennan et al. |
| 5,199,649 A | 4/1993 | Tolboll |
| 5,326,036 A | 7/1994 | Wilger |
| 5,375,767 A | 12/1994 | Thorstensson |
| 5,498,042 A | 3/1996 | Dole |
| 5,516,044 A | 5/1996 | Thorstensson |
| 5,595,217 A | 1/1997 | Gillen et al. |
| 5,642,907 A | 7/1997 | Dole |
| 5,673,896 A | 10/1997 | Gillen |
| RE35,690 E | 12/1997 | Rasmussen et al. |
| 5,971,295 A | 10/1999 | Jensen et al. |
| 5,988,699 A | 11/1999 | Quandt |
| D419,570 S | 1/2000 | Blondeel et al. |
| 6,053,427 A | 4/2000 | Wilger et al. |
| 6,126,088 A | 10/2000 | Wilger et al. |
| 6,131,236 A | 10/2000 | Roth |
| 6,131,821 A | 10/2000 | Nejsum |
| 6,152,388 A | 11/2000 | Rohloff |
| 6,189,807 B1 | 2/2001 | Miller et al. |
| 6,196,473 B1 | 3/2001 | Beeren et al. |
| 6,250,564 B1 | 6/2001 | Chahley |
| 6,367,712 B1 | 4/2002 | Larsen |
| 6,371,491 B1 | 4/2002 | Schultz et al. |
| 6,398,128 B1 | 6/2002 | Hamilton et al. |
| 6,412,824 B2 | 7/2002 | Kunsman |
| 6,478,236 B1 | 11/2002 | Norman et al. |
| 6,595,553 B2 | 7/2003 | Medici et al. |
| 6,598,538 B2 | 7/2003 | Semple et al. |
| 6,669,120 B2 | 12/2003 | Vernia |
| 6,732,878 B2 | 5/2004 | Gillen |
| 6,749,134 B2 | 6/2004 | Arenson et al. |
| 6,758,909 B2 | 7/2004 | Jonnalagadda et al. |
| 6,772,964 B2 | 8/2004 | Funseth et al. |
| 6,854,668 B2 | 2/2005 | Wancho et al. |
| 6,904,953 B2 | 6/2005 | Frick et al. |
| 6,911,170 B2 | 6/2005 | Speier et al. |
| 6,945,273 B2 | 9/2005 | Reid |
| 6,969,014 B2 | 11/2005 | Bauer et al. |
| 6,971,633 B2 | 12/2005 | Gillen |
| 6,979,152 B2 | 12/2005 | Bodie et al. |
| 7,156,321 B2 | 1/2007 | Wichmann |
| 7,175,109 B2 | 2/2007 | Schroeder et al. |
| 7,290,426 B2 | 11/2007 | Landvatter et al. |
| 7,370,815 B2 | 5/2008 | Fecht et al. |
| D577,423 S | 9/2008 | Dole |
| 7,458,619 B2 | 12/2008 | Cassel et al. |
| 7,490,871 B2 * | 2/2009 | Avram et al. ............ 285/420 |
| 7,503,591 B2 | 3/2009 | Beeren et al. |
| 7,552,881 B2 | 6/2009 | Lipthal et al. |
| 7,559,569 B2 | 7/2009 | Nejsum |
| D597,635 S | 8/2009 | Dole |
| D598,076 S | 8/2009 | Dole |
| 7,584,803 B2 | 9/2009 | Ballard |
| 7,950,794 B2 | 5/2011 | Vanini |
| 2002/0050717 A1 | 5/2002 | Medici et al. |
| 2002/0175229 A1 | 11/2002 | Vernia |
| 2002/0175309 A1 | 11/2002 | Vernia |
| 2004/0124283 A1 | 7/2004 | Medici et al. |
| 2004/0164457 A1 | 8/2004 | Rogers et al. |
| 2004/0207199 A1 | 10/2004 | Greco |
| 2004/0262432 A1 | 12/2004 | Norman |
| 2004/0265071 A1 | 12/2004 | Bodie et al. |
| 2005/0269430 A1 | 12/2005 | Bodie |
| 2006/0278736 A1 | 12/2006 | Reilly et al. |
| 2007/0246563 A1 | 10/2007 | Bodie |
| 2008/0054636 A1 | 3/2008 | Reid |
| 2008/0087750 A1 | 4/2008 | Waddelow et al. |
| 2008/0105442 A1 | 5/2008 | Reilly et al. |
| 2008/0129048 A1 | 6/2008 | Nagle et al. |
| 2009/0205402 A1 | 8/2009 | Jackson et al. |
| 2010/0110825 A1 | 5/2010 | Puglia et al. |
| 2010/0181081 A1 | 7/2010 | Reilly et al. |
| 2010/0193203 A1 | 8/2010 | Reilly et al. |
| 2010/0193609 A1 | 8/2010 | Reilly et al. |

FOREIGN PATENT DOCUMENTS

| | | |
|---|---|---|
| CA | 2466874 | 9/2004 |
| CA | 2469239 | 12/2004 |
| CA | 2537580 | 11/2006 |
| EP | 0277108 | 1/1987 |
| EP | 0357154 | 3/1990 |
| EP | 0501906 | 9/1992 |
| EP | 0724976 | 8/1996 |
| EP | 0940079 | 9/1999 |
| EP | 1023831 | 8/2000 |
| EP | 1151705 | 11/2001 |
| EP | 1163847 | 12/2001 |
| EP | 1419825 | 5/2004 |
| EP | 1529722 | 5/2005 |
| EP | 1576996 | 9/2005 |
| EP | 1582247 | 10/2005 |
| EP | 2087784 | 12/2009 |
| EP | 2184521 | 5/2010 |
| WO | WO95/03688 | 2/1995 |
| WO | WO2005/107953 | 11/2005 |
| WO | WO2006/135891 | 12/2006 |

* cited by examiner

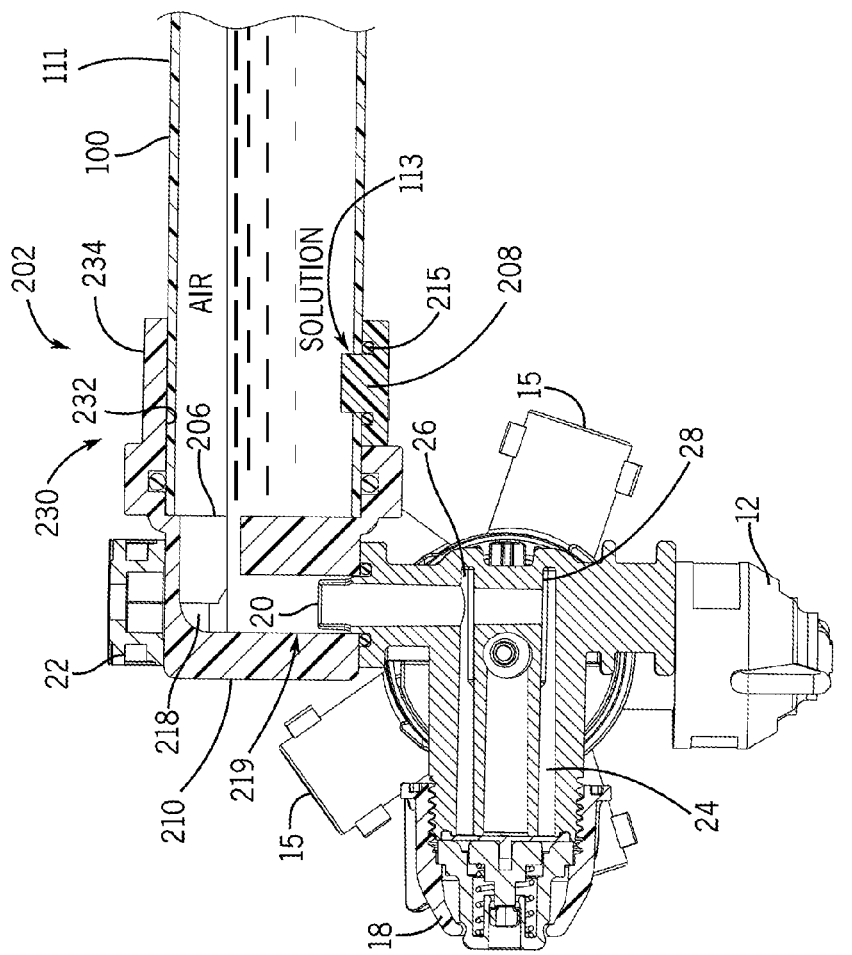
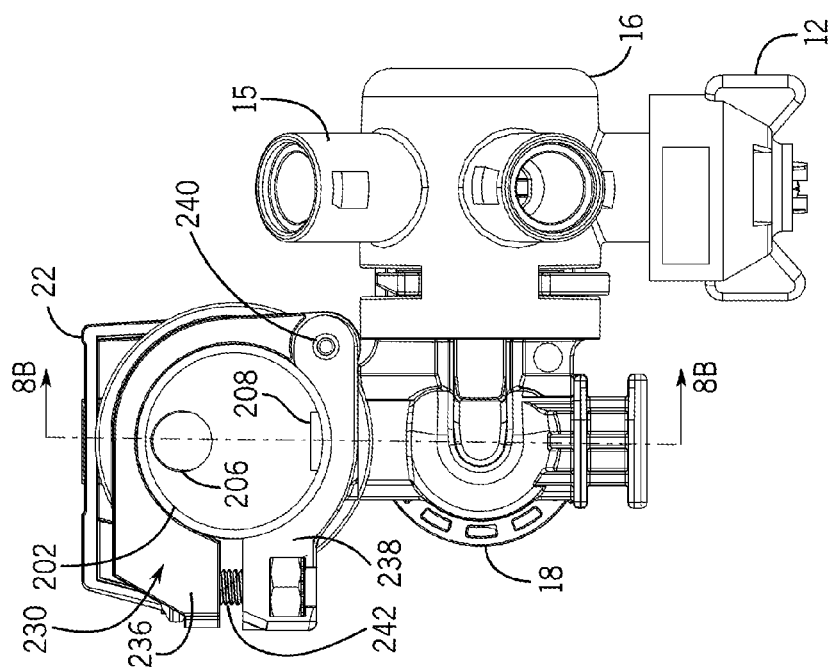
FIG. 8B
FIG. 8A

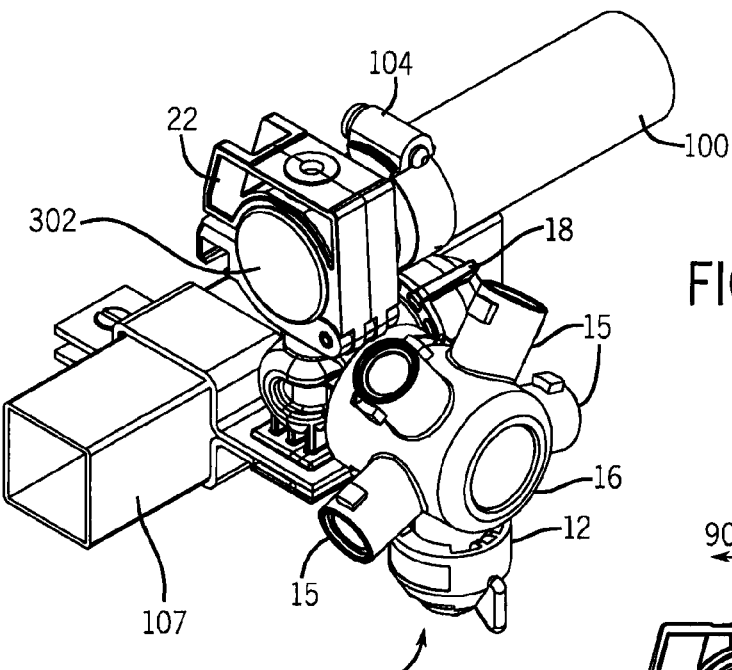
FIG. 9A
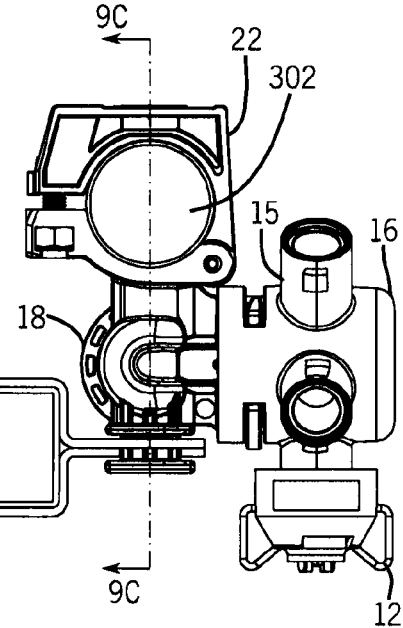
FIG. 9B
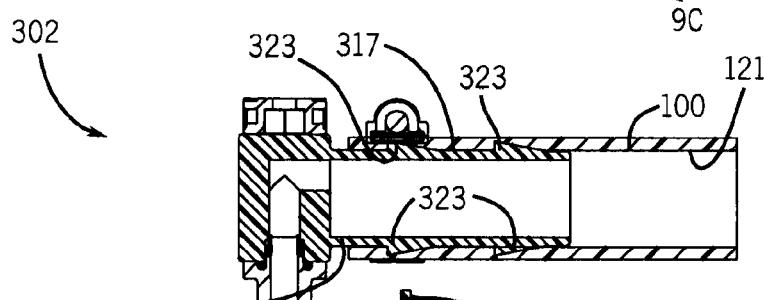
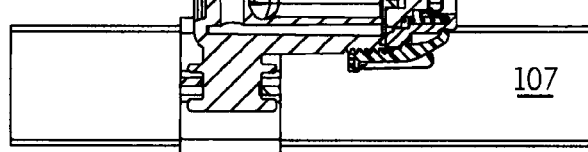
FIG. 9C

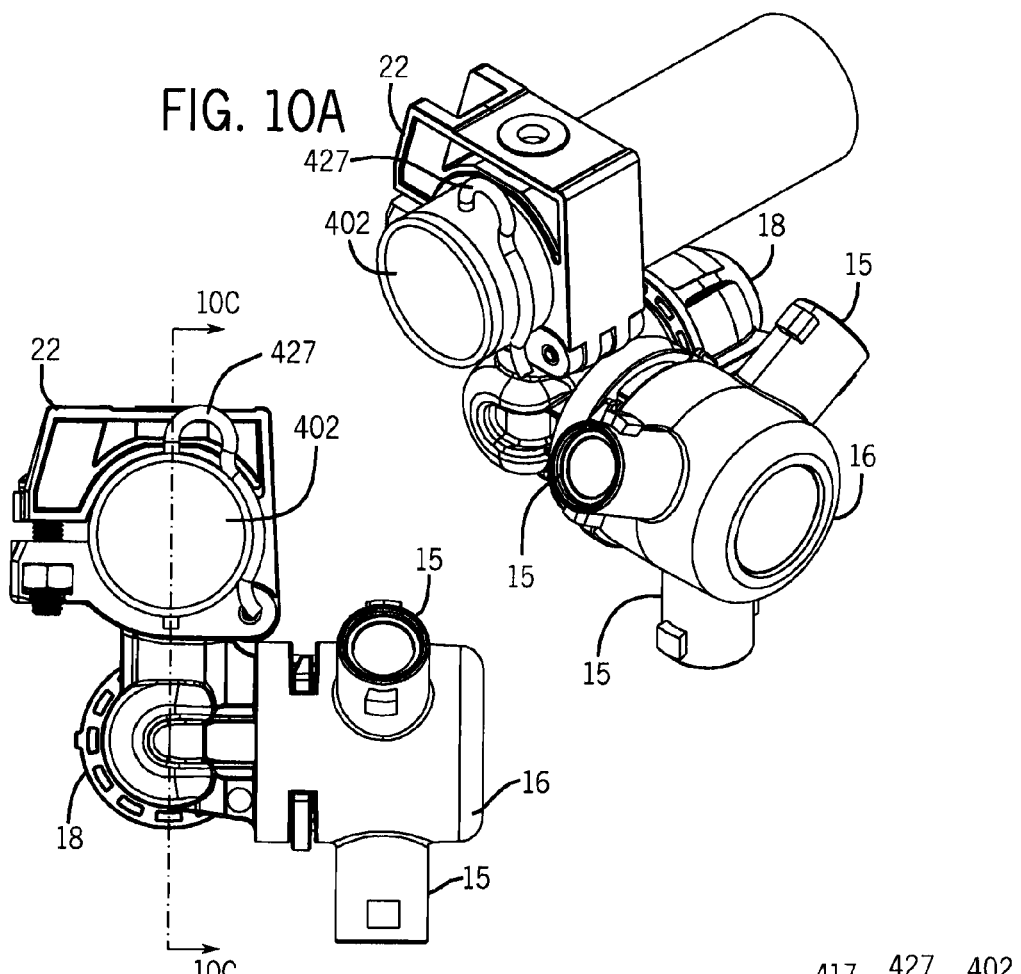
FIG. 10A
FIG. 10B
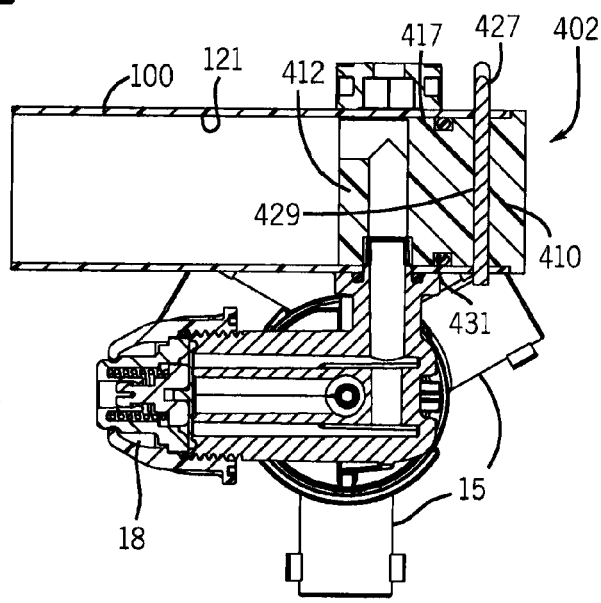
FIG. 10C

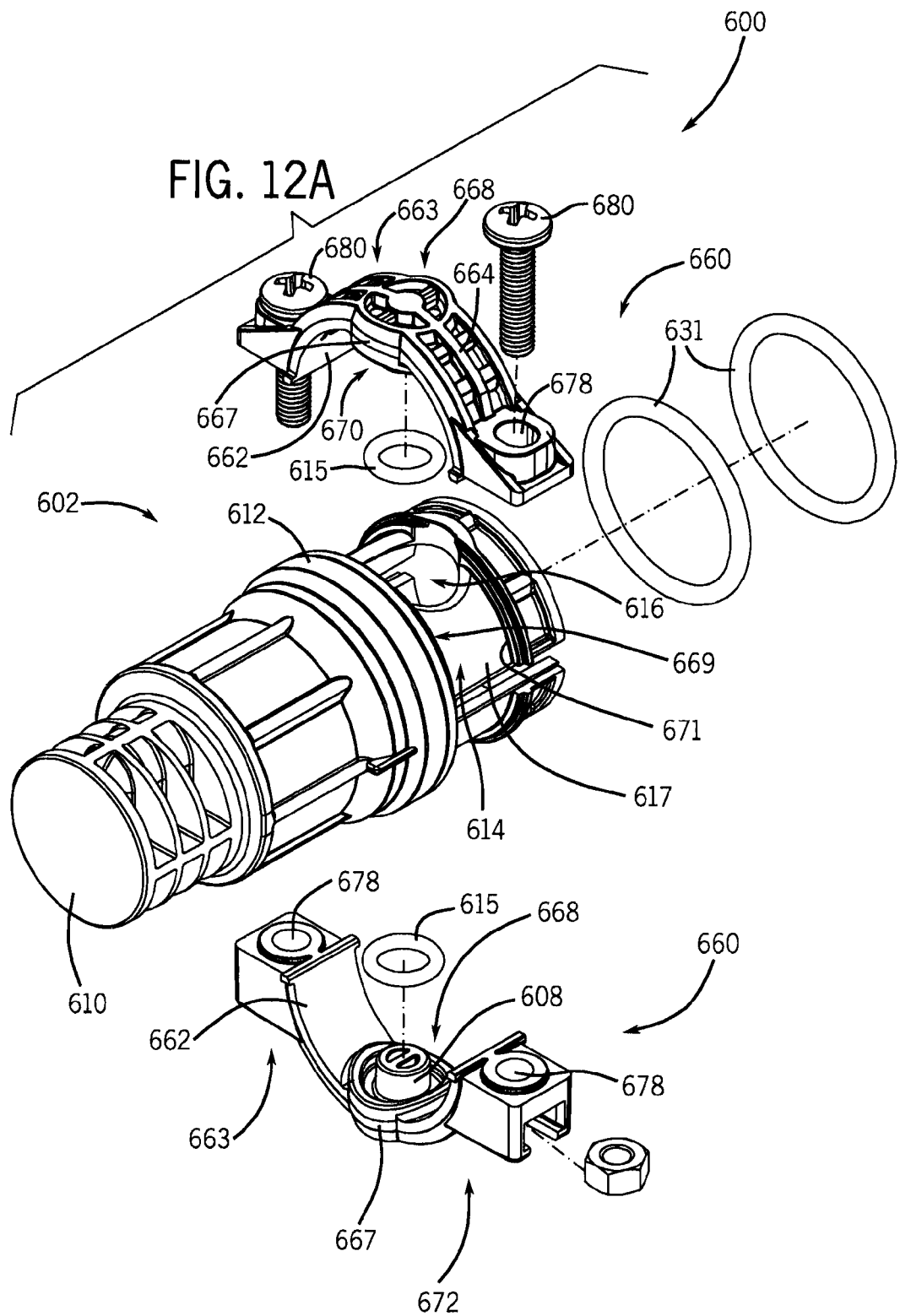

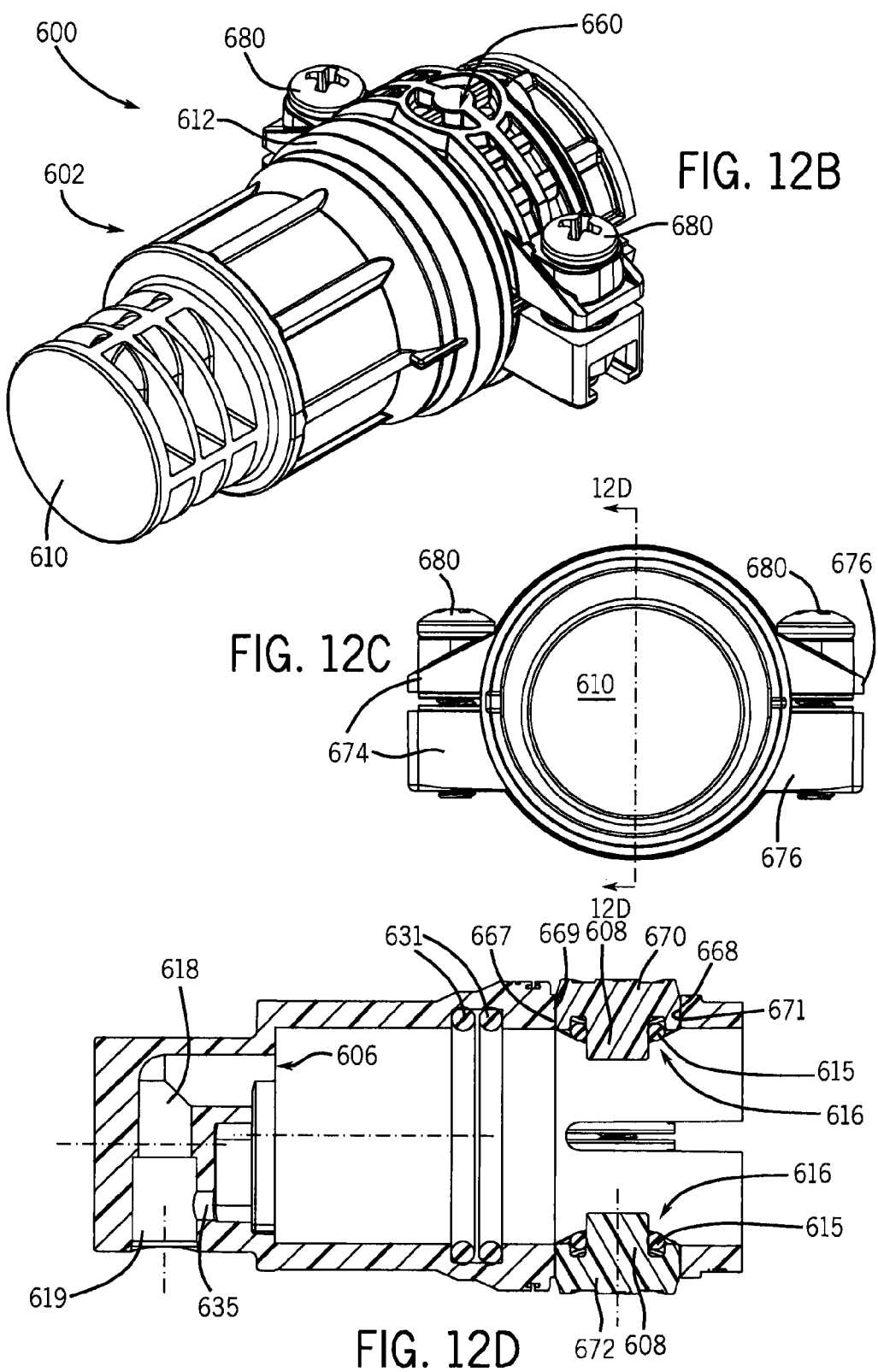

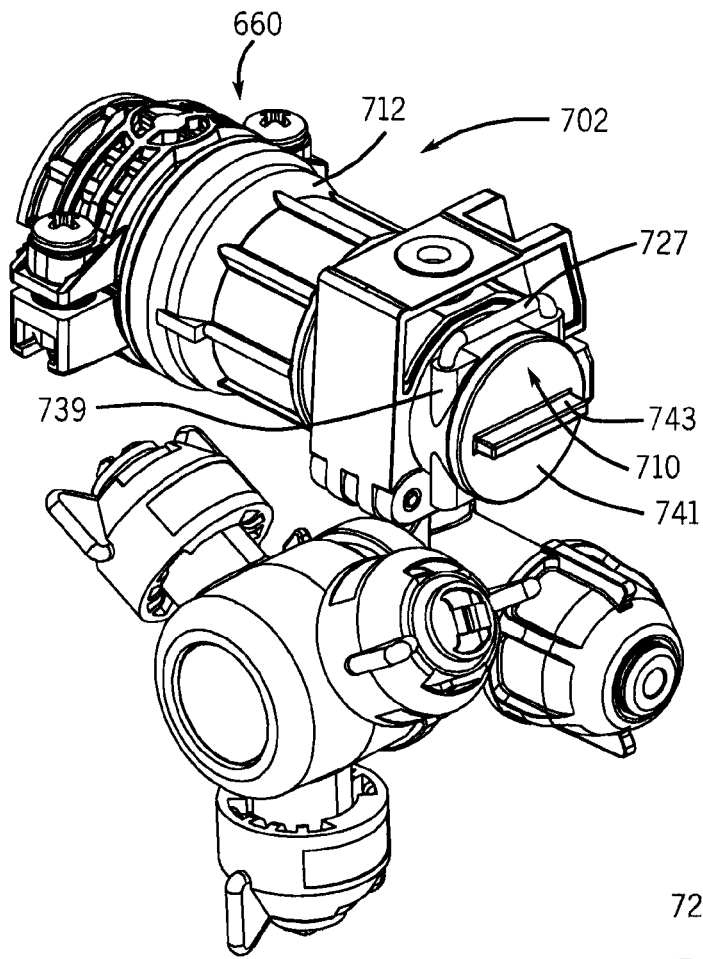
FIG. 13A
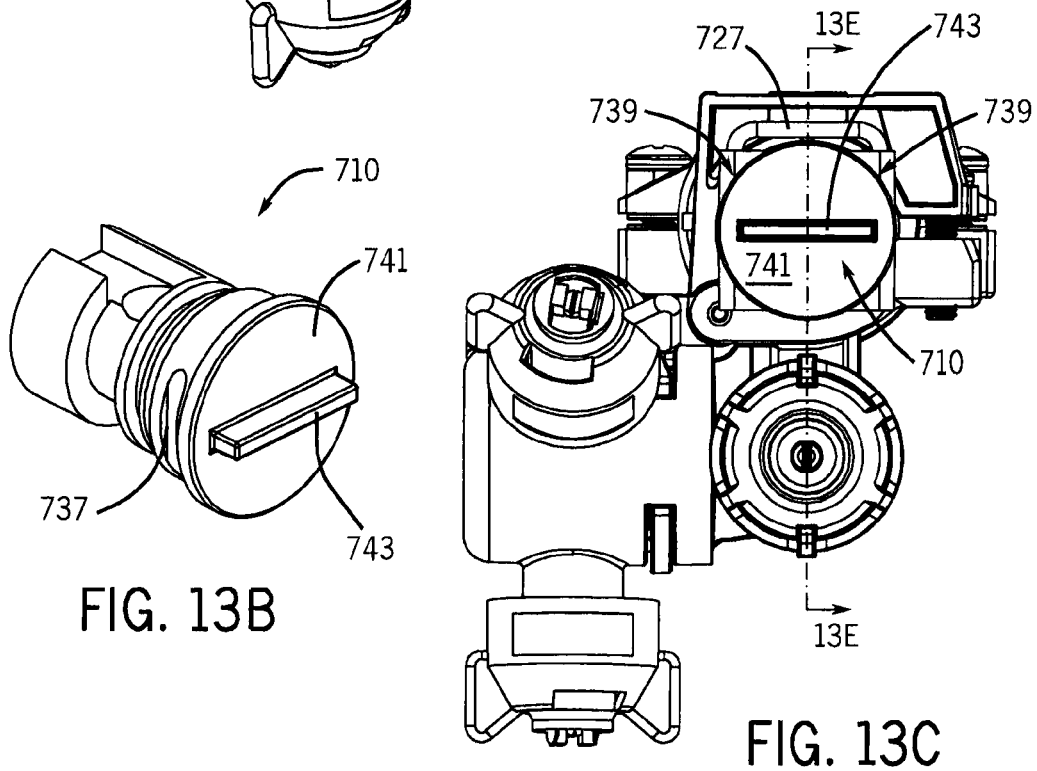
FIG. 13B
FIG. 13C

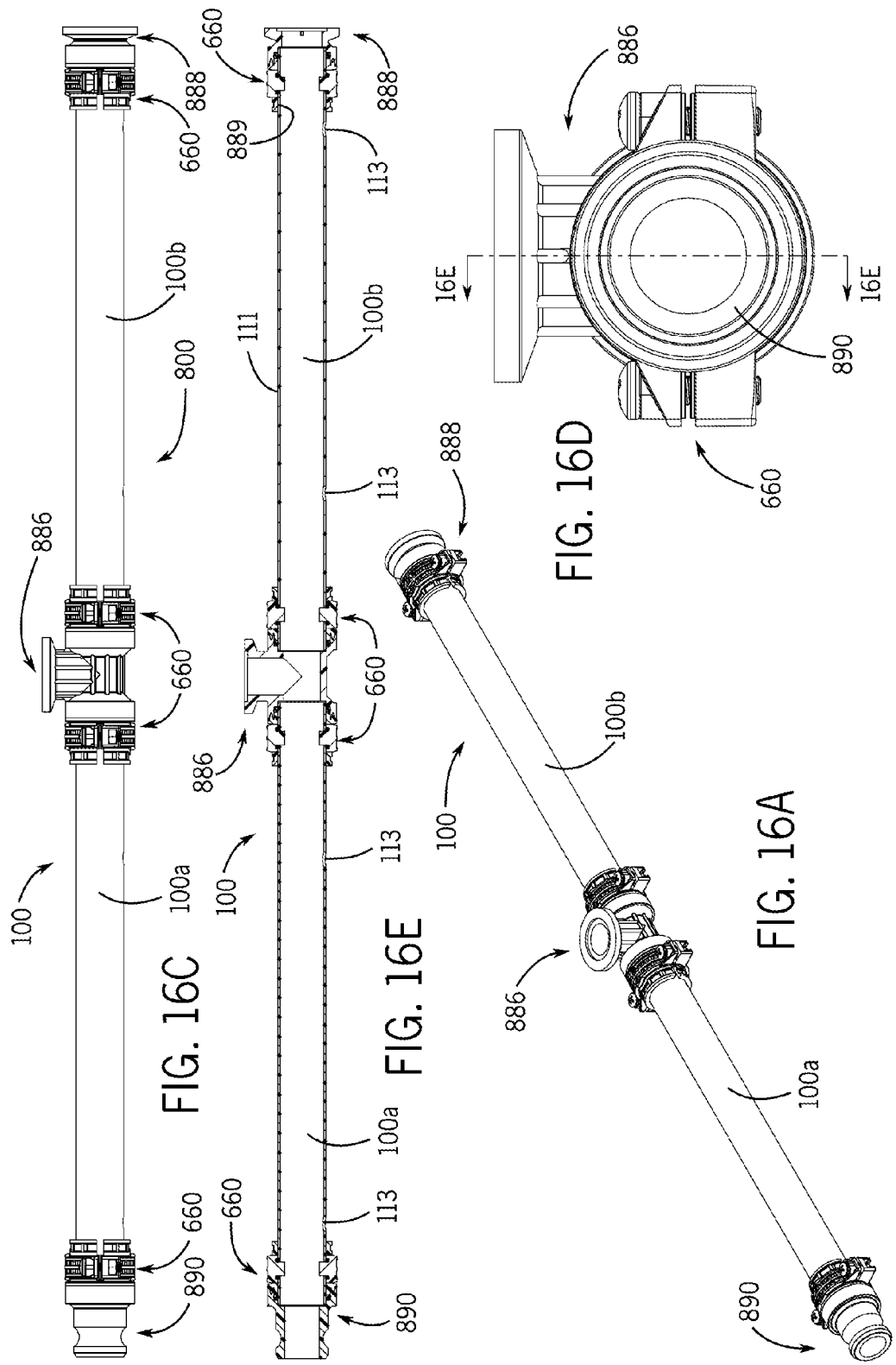

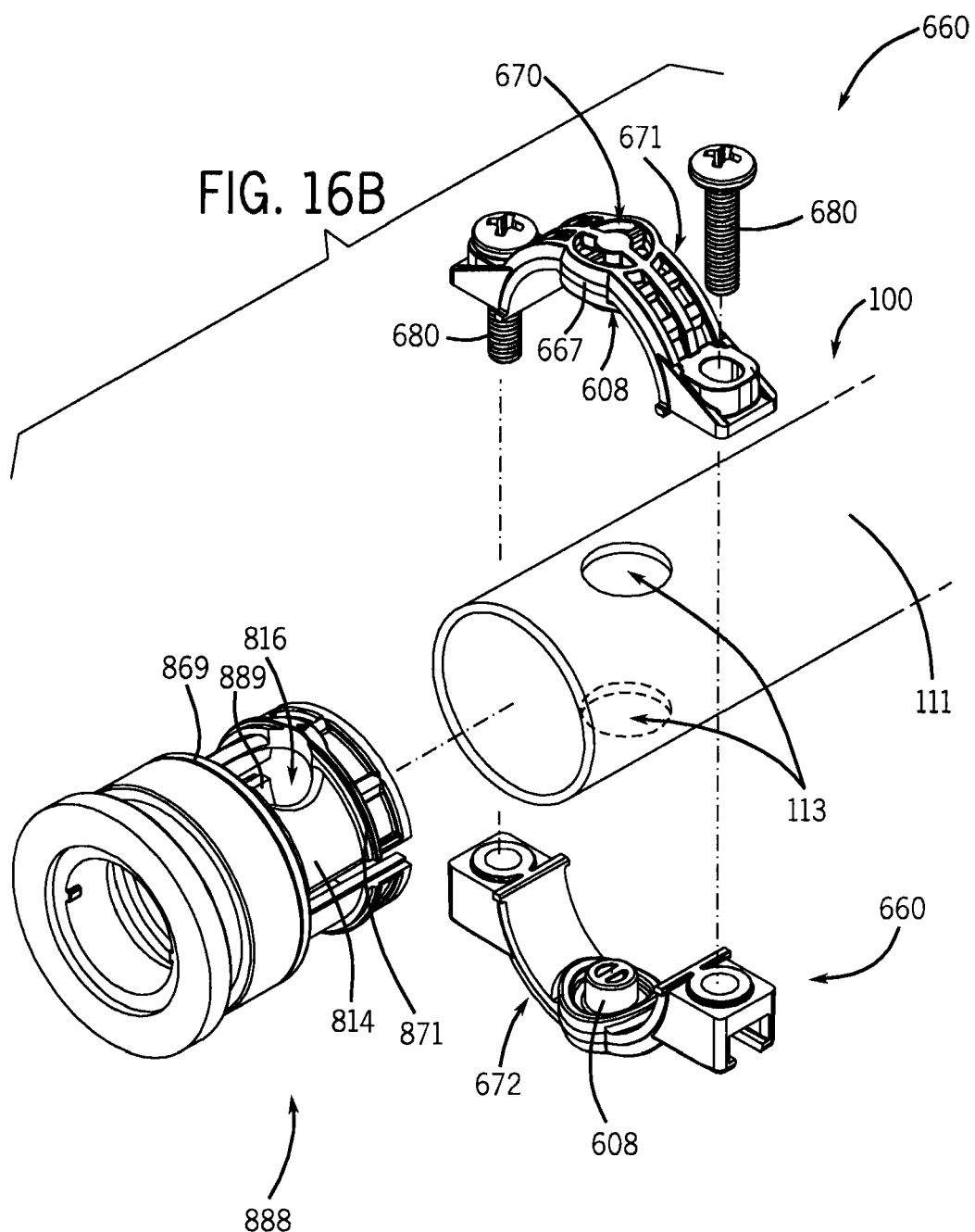

AIR ASPIRATION DEVICE

CROSS REFERENCE TO RELATED APPLICATIONS

This application claims priority to U.S. Provisional Application No. 61/320,464 filed on Apr. 2, 2010. The entire disclosure of the prior application is considered part of the accompanying application and is hereby incorporated therein by reference.

BACKGROUND

The objective of an agricultural crop spraying machine is to effectively distribute an agro-chemical spray over the largest area of crop in the least amount of time. The conventional design for such a machine is a wheeled base unit, be it trailed or self-propelled, which carries a tank, pump, and controls. The conventional design supplies the agro-chemical to the distribution booms extending from either side of the wheeled base unit, perpendicular to the direction of travel.

Nozzle bodies are placed at regular intervals along the spray boom. This is referred to as a wet boom configuration. The primary role of the nozzle bodies is to provide a sealed connection between the pipe work of the boom supply and the spray tips distributing the agro-chemical. The nozzle bodies also position the spray tips at the correct angle with respect to the direction of travel. Each nozzle body has a turret to which the spray tips are attached to regulate spray pattern and flow rate.

The nozzle body is designed to siphon solution from the pipe or metal tubing from the bottom of the pipe. This orientation causes a situation where air, which is normally present in varying concentration, is pumped into the boom pipe. Air is less dense than the solution being applied and is therefore trapped in the top of the boom pipe above the solution. Air is a compressible gas that accumulates in the top of the boom and builds in pressure. When the sprayer is shut off at the end of a pass on the field or when the operator is finished spraying, the pressure in the boom pipe is still greater than the activation pressure in the diaphragm check valves (e.g., 0.5 bar) due to the air acting as an accumulator. This creates the problem of the nozzle assemblies continuing to dispense solution even after the sprayer valve is shut off. As the nozzle assemblies continue to dispense solution, the air pressure in the boom pipe decreases as the air volume expands. The nozzles will continue to dispense solution until the air pressure in the boom decreases to the point where the pressure in the boom equals the activation pressure of the diaphragm check valve. With the presence of air in the boom pipe, shutoff times can be delayed by up to eight seconds, resulting in a significant amount of solution that is applied when and where it is not intended.

SUMMARY OF THE INVENTION

Some embodiments of the invention provide an air aspiration device for releasing air stored in a pipe when delivering a solution to a nozzle body with a feed spigot. The air aspiration device can include a main body that engages the pipe. The air aspiration device can also include a female pipe fitting that can be coupled to the main body. The female pipe fitting can form an end cap for one end of the pipe. The female pipe fitting can engage the feed spigot. The device can include an air port in the female pipe fitting that is in fluid communication with the solution and the air, and can further include a passageway through the female pipe fitting that is in fluid communication with the air port. The passageway can deliver both the solution and the air to the feed spigot. The air aspiration device can also include an exit port in the female pipe fitting that is in fluid communication with the passageway and that engages the feed spigot.

In another embodiment, the invention can provide an air aspirator assembly to release air trapped in a pipe when delivering a solution to a nozzle body that includes a feed spigot. The pipe can include an aperture. The assembly can include a main body that engages the pipe. The assembly can also include a female pipe fitting that engages the feed spigot and a clamp. The female pipe fitting can include an air port that is in fluid communication with the solution and the air, a passageway that is in fluid communication with the air port so that it can deliver both the solution and the air to the feed spigot, and an exit port in fluid communication with the passageway and that engages the feed spigot. The clamp can include a body portion having an internal surface with a button. The button can engage the aperture in the pipe in order to maintain an angular orientation between the main body and the pipe.

The invention can also provide a removable clamp for coupling an adapter to a pipe delivering a solution, the adapter including a first aperture, and the pipe including a second aperture. The removable clamp can include a body portion having a first clamp component and a second clamp component together creating an internal surface. The clamp can also include a first button located on the internal surface. The internal surface of the body portion can engage an outer surface of the adapter so that the first button is received by the first aperture and the second aperture in order to maintain an angular relationship between the adapter and the pipe.

In another embodiment, the invention can provide a fluid delivery system. The fluid delivery system can include a boom delivering fluid from a fluid source, with the boom including a first section with a first aperture and a second section with a second aperture. The fluid delivery system can also include a tee adapter coupled to the first section and the second section. The tee adapter can receive fluid from the fluid source and deliver the fluid to the first section and the second section. The fluid delivery system can also include a first clamp and a second clamp. The first clamp can include a first button that can be received by the first aperture. The second clamp can include a second button that can be received by the second aperture. The first clamp can couple the tee adapter to the first section and the second clamp can couple the tee adapter to the second section in order to maintain an angular relationship between the first section and the second section.

These and other features, aspects, and advantages of the present invention will become better understood upon consideration of the following detailed description, drawings, and appended claims.

DESCRIPTION OF THE DRAWINGS

FIG. 8A is a side elevational view showing an internal portion of the air aspiration device from FIG. 7A assembled with a boom and nozzle body.

FIG. 8B is a cross sectional view taken along line 8B-8B of FIG. 8A.

FIG. 9A is a perspective view of an alternative embodiment of the invention including an air aspiration device assembly on a dry boom.

FIG. 9B is a side elevational view of the air aspiration device assembly on the dry boom of FIG. 9A.

FIG. 9C is a cross sectional view taken along line 9C-9C of FIG. 9B.

FIG. 10A is a perspective view of an alternative embodiment of the invention including an air aspiration device assembly on a wet boom.

FIG. 10B is a side elevational view of the air aspiration device and the wet boom of FIG. 10A.

FIG. 10C is a cross sectional view taken along line 10C-10C of FIG. 10B.

FIG. 12A is an exploded perspective view of another embodiment of the air aspiration device and clamp assembly.

FIG. 12B is a perspective view of the assembled air aspiration device and clamp assembly of FIG. 12A.

FIG. 12C is a side elevational view showing an internal view of the air aspiration device of FIG. 12B.

FIG. 12D is a cross sectional view taken along line 12D-12D of FIG. 12C.

FIG. 13A is a perspective view of an alternative embodiment of the air aspiration device and clamp assembly.

FIG. 13B is a perspective view of a female pipe fitting of the air aspiration device of FIG. 13A.

FIG. 13C is a side elevational view of the air aspirator and clamp assembly of FIG. 13A.

FIG. 16A is a perspective view of a wet boom that includes a male camlock adapter, a universal flange tee adapter, and a universal flanged adapter attached to the boom with removable clamps.

FIG. 16B is an exploded perspective view of the universal flange adapter and associated clamp assembly of FIG. 16A.

FIG. 16C is a front elevational view of the wet boom of FIG. 16A.

FIG. 16D is a side elevational view of the wet boom of FIG. 16A.

FIG. 16E is a cross-sectional view taken along line 16E-16E of FIG. 16D.

DETAILED DESCRIPTION

Figure 1:
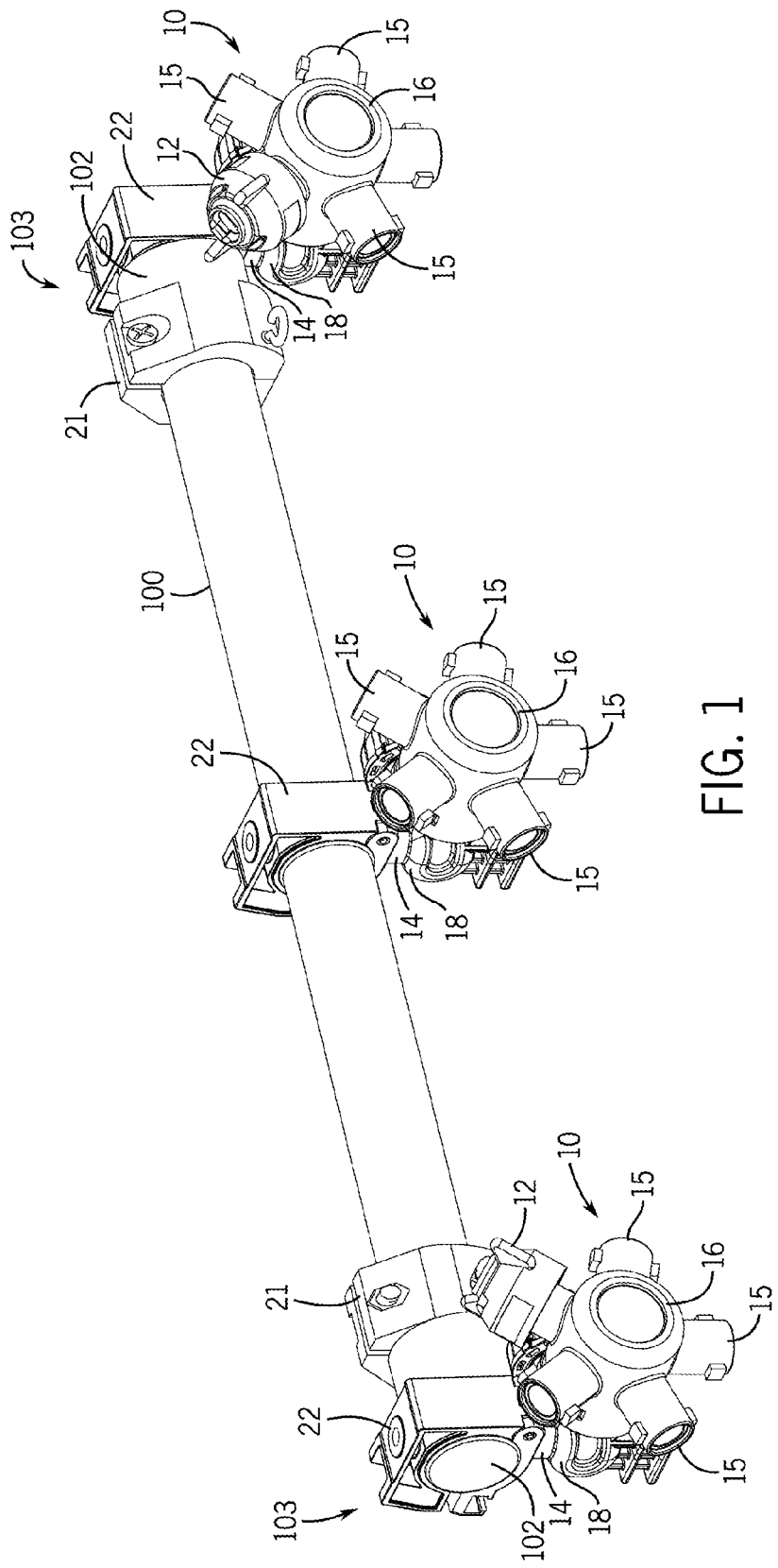
FIG. 1 is a perspective view of a wet boom incorporating two air aspiration devices.
Figure 2:
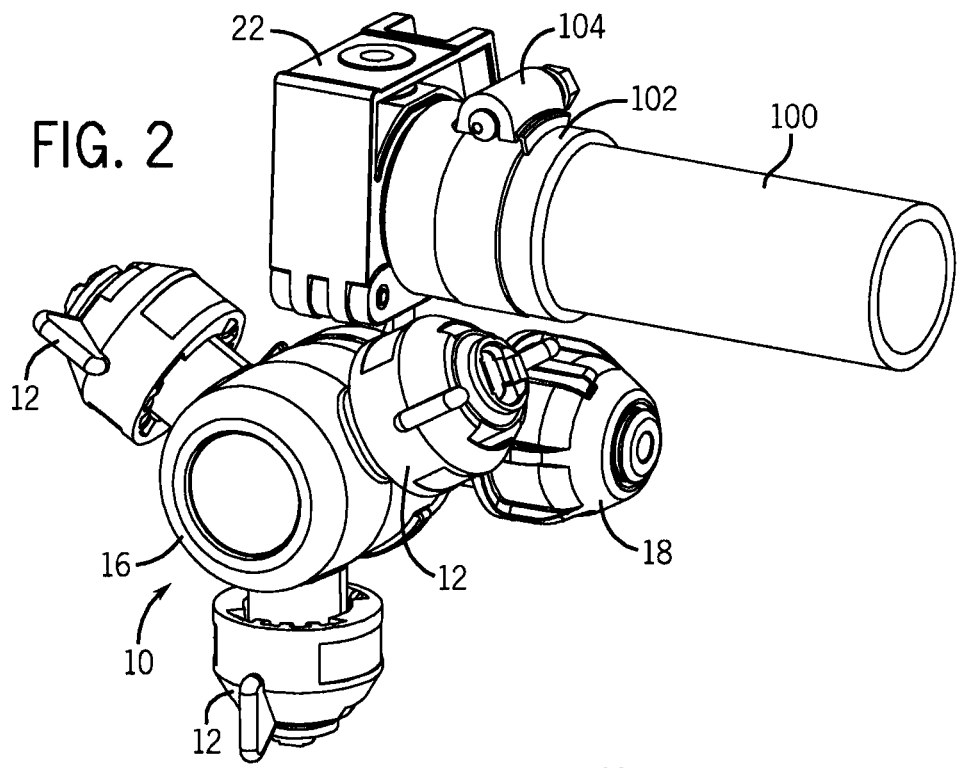
FIG. 2 is a perspective view of one of the air aspiration devices and associated clamp assembly on the wet boom of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates a spray boom pipe 100 to which several nozzle bodies 10 are attached. The spray boom pipe 100 can be an agricultural boom and can be used for delivering a fluid solution (i.e., water and/or chemicals) to the nozzle bodies 10. Each nozzle body 10 includes spray tips 12, a main body 14, a turret 16, a valve assembly 18, and a pipe clamp 22. As an example in FIG. 1, two spray nozzles 12 are shown attached to ports 15 of the turret 16 of the nozzle body 10. In some embodiments, the turret 16 can include three, four, or five ports 15 to receive a corresponding number of spray nozzles 12. In some embodiments, the turret 16 can be a multi-port indexable turret. In some embodiments, the valve assembly 18 can be a diaphragm check valve assembly. Two wet boom adapters 103 are also shown in FIG. 1. The wet boom adapters 103 include an air aspiration device 102. The adapters 103 can also each include an adapter hinge 21 to attach the air aspiration device 102 to the spray boom pipe 100.

Figure 3:
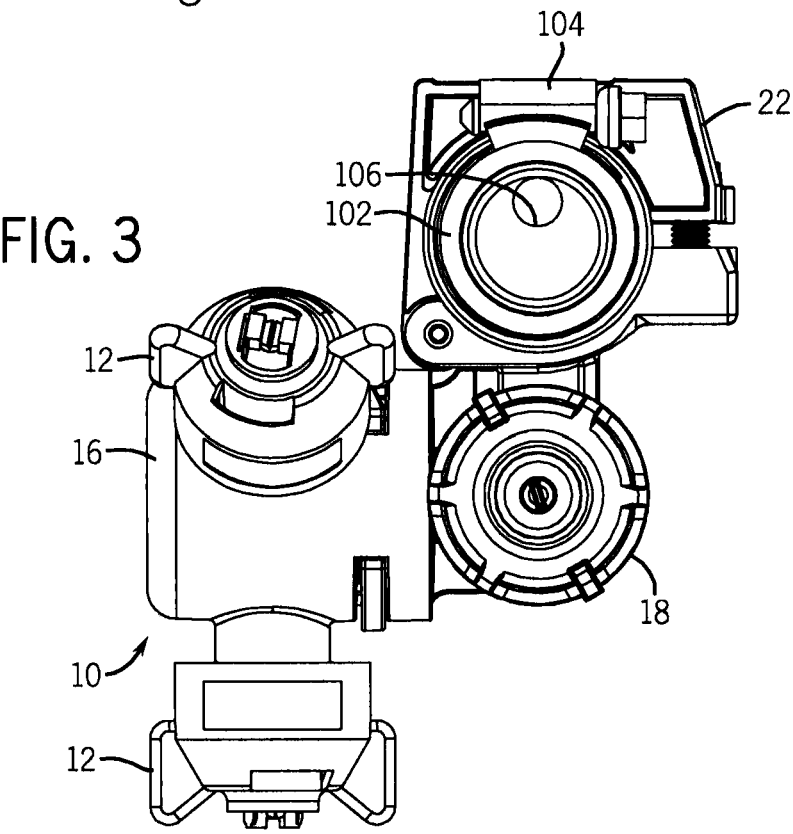
FIG. 3 is perspective view showing an internal portion of the air aspiration device assembly in FIG. 2.
Figure 4:
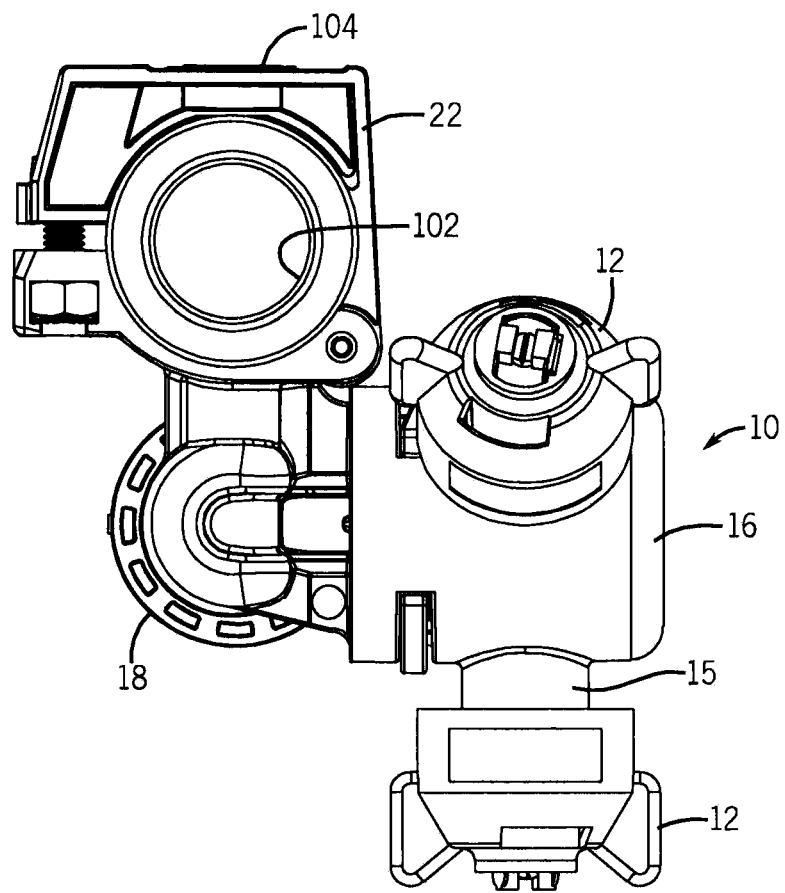
FIG. 4 is a side elevational view of the air aspiration device assembly of FIG. 2.
Figure 5:
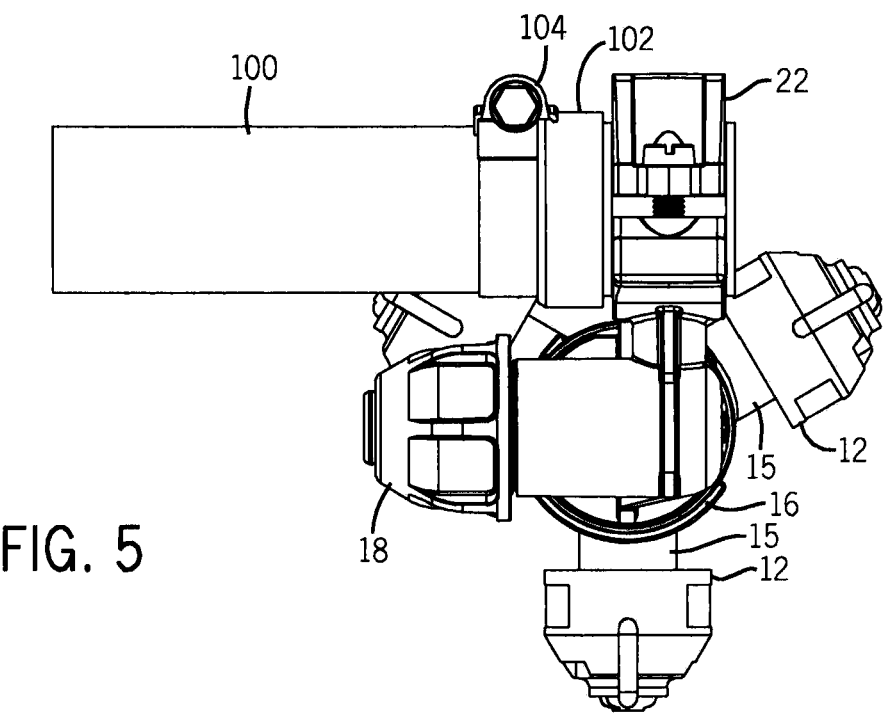
FIG. 5 is a rear elevational view of the air aspiration device assembly of FIG. 2.

FIGS. 2-5 illustrate an air aspiration device 102 attached to the boom 100 with a hose clamp 104. The air aspiration device 102 can form an end cap on an end of the boom 100. As shown in FIG. 3, the air aspiration device 102 can include an air port 106 that is in fluid communication with the boom 100 and the solution (not shown) it delivers to the nozzle bodies 10. As discussed above, the boom 100 may also include air that is trapped above the solution inside the boom 100. The air aspiration device 102 is designed such that the air port 106 is in fluid communication not only with the solution in the boom 100, but also with the air trapped above the solution. This allows the trapped air to be siphoned from the boom 100 and delivered to the nozzle body 10 coupled to the air aspiration device 102.

Figure 6:
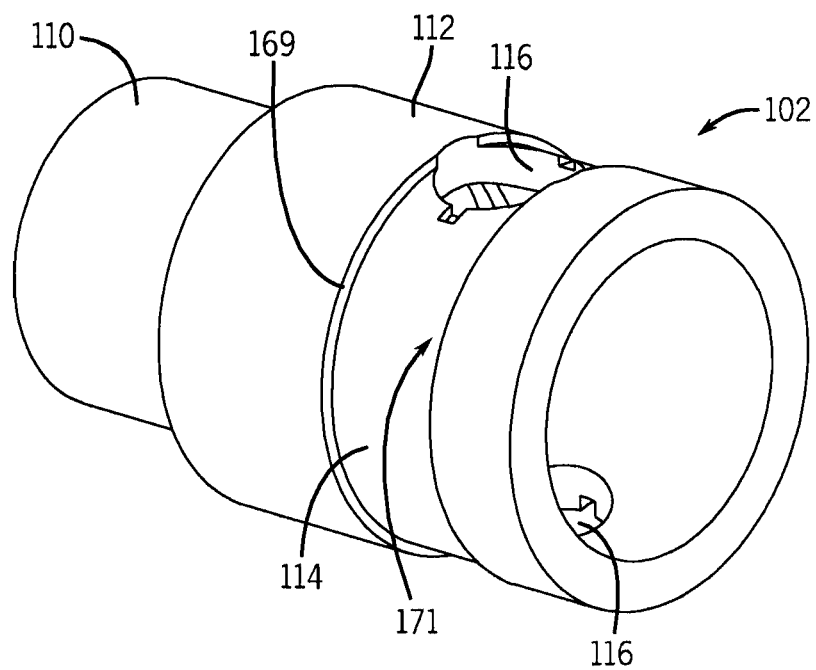
FIG. 6 is a perspective view of the air aspiration device of FIG. 2.

FIG. 6 illustrates an air aspiration device 102 according to one embodiment of the invention. The air aspiration device 102 can be generally cylindrical and can include a main body 112 and a female pipe fitting 110. The main body 112 can be designed to engage the boom. The main body 112 can include a recessed portion 114 with a first shoulder 169 and a second shoulder 171. The air aspiration device 102 can include one or more apertures 116. While the apertures 116 are shown to be located in the recess 114 in FIG. 6, the apertures 116 may be located elsewhere in the air aspiration device 102.

Figure 7A:
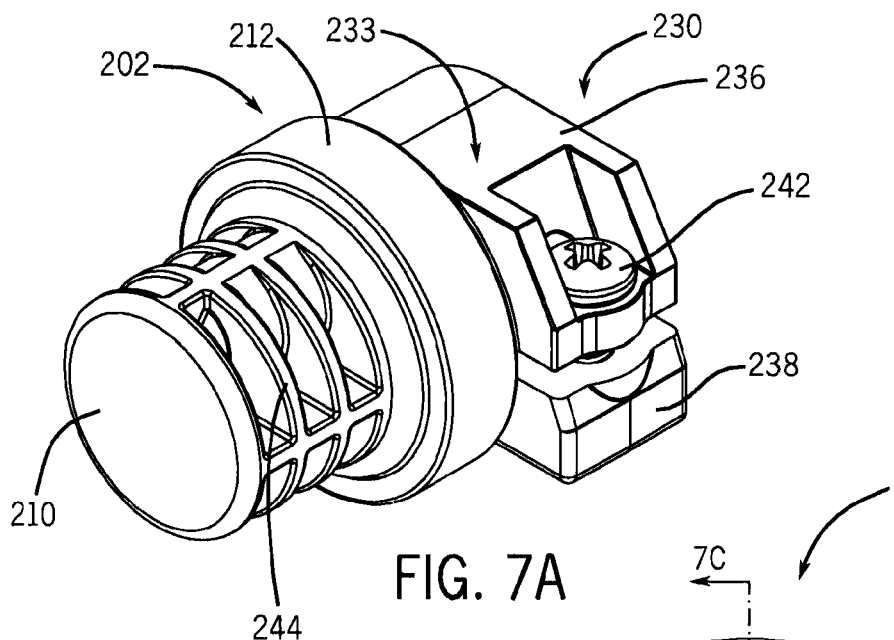
FIG. 7A is a perspective view of another embodiment of an air aspiration device.
Figure 7B:
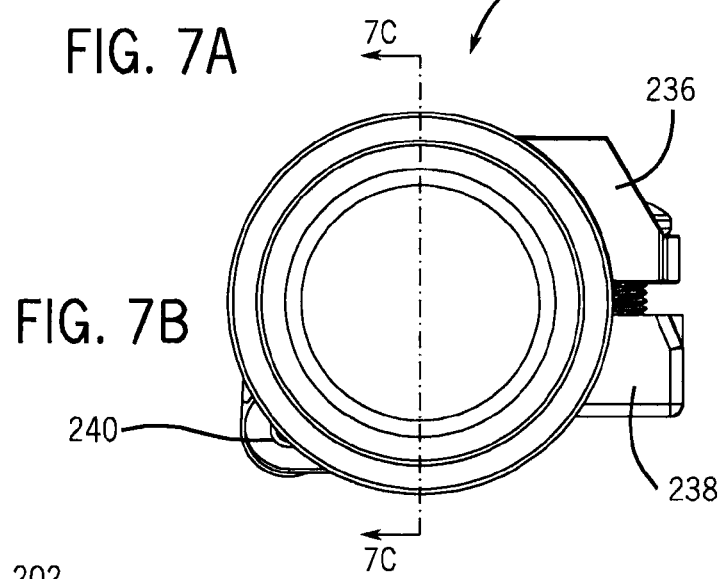
FIG. 7B is a side elevational view of the air aspiration device of FIG. 7A.
Figure 7C:
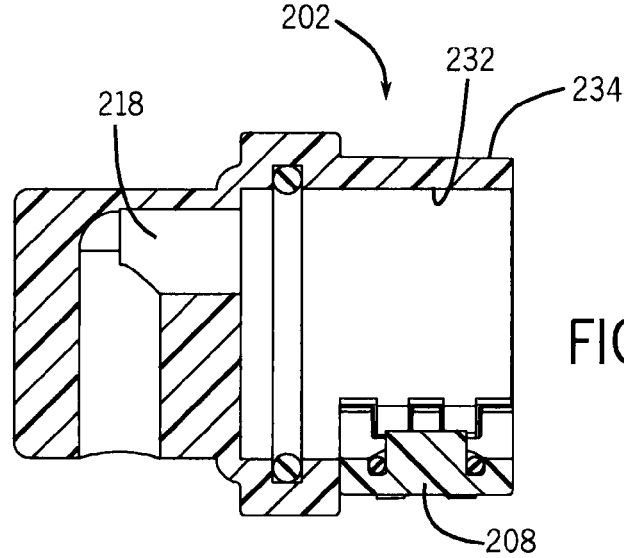
FIG. 7C is a cross sectional view taken along line 7C-7C of FIG. 7B.

FIGS. 7A-7C illustrate an alternative embodiment for an air aspiration device 202 including a clamp 230 that is integral with the main body 212. As shown in FIG. 7C, the clamp 230 includes a button 208 that is designed to sealingly engage an aperture in the boom, as will be further described below. The clamp 230 includes a body portion 233 with an internal surface 232 and an external surface 234. The clamp 230 can include a first clamping component 236 and a second clamping component 238 that are hinged together with a hinge pin 240. A fastener 242 can be used to tighten the internal surface 232 of the clamp against an exterior surface of a boom when attaching the air aspiration device 202 to the boom. As shown in FIG. 7A, the air aspiration device 202 can include ribs 244 that are beneficial for obtaining a more uniform thickness when manufacturing the device 202.

FIGS. 8A and 8B illustrate another embodiment of an air aspiration device 202 assembled on a wet boom pipe 100. A feed spigot 20 can be in fluid communication with the spray boom pipe 100. A pipe clamp 22 can secure the nozzle body 10 to the boom 100. The feed spigot 20 can also be in fluid communication with a valve chamber 24 via a first or upper feed point 26 and a second or lower feed point 28. The use of multiple feed points between the feed spigot 20 and the valve chamber 24 can result in increased flow capacity with little change in dimensional envelope and substantially no change in the geometry of the diaphragm check valve assembly 18. In some embodiments, the first feed point 26 and the second feed point 28 can break into the valve chamber 24 at both the top side and the bottom side, respectively. This can allow greater flow rates and can be achieved with the feed spigot 20 and the valve chamber 24 being a single molded piece.

As shown in FIG. 8B, the air aspiration device 202 can include a passageway 218 and an exit port 219. The passageway 218 is in fluid communication with the air port 206 and the exit port 219, and also is in fluid communication with the solution and the air in the boom 100. The air port 206 can be formed in the female pipe fitting 210 and can be designed so that the air port 206 is in fluid communication with both the solution and the trapped air in the boom 100. The air port 206 can be positioned asymmetrically toward a top portion of the main body 212 and the boom 100. The passageway 218 can be designed to alter the direction of the solution and the air as the solution and the air travel from the boom 100 to the exit port 219. For example, the passageway 218 can be a right angle passageway. The turbulent flow path can help to mix the air with the solution to help release trapped air from the boom 100. Additionally, the right angle passageway helps keep the air aspiration device 202 from projecting too far from the end of the boom 100 for a more compact overall boom 100 length.

As shown in FIG. 8B, the female pipe fitting 210 engages the feed spigot 20. The feed spigot 20 can engage the female pipe fitting 210 at the exit port 219. This engagement allows solution and air trapped in the boom 100 to travel from the boom 100 to the air aspiration device 202, enter the air port 206, and pass through the passageway 218 and the exit port 219 of the air aspiration device 202 as it flows to the nozzle body 10 at the feed spigot 20.

Different embodiments of the air aspiration device can be designed to attach to the boom 100 in different ways. For example, the air aspiration device 202 can be designed to clamp to the boom 100 using an integral clamp 230, as shown in FIGS. 8A and 8B. The clamp 230 can include an internal surface 232, an external surface 234, a first clamping component 236, and a second clamping component 238 that are hinged together with a hinge pin 240. A fastener 242 can be used to tighten the internal surface 232 of the clamp against an exterior surface 111 of a boom 100 when attaching the air aspiration device 202 to the boom 100. An internal surface 232 of the clamp 230 can engage an external surface 111 of the boom 100, as shown in FIGS. 8A and 8B. The clamp 230 can include a button 208 for engaging an aperture 113 in the boom 100. The button 208 sealingly engages the air aspiration device 202 to the boom 100. A gasket 215, such as an o-ring, can be used to help seal the button 208 and the aperture 113 in the boom 100. In addition, the button 208 ensures that the air aspiration device 202 maintains a specific angular orientation with respect to the boom 100. In other words, the air aspiration device 202 can be prevented by the button 208 from rotating when attached to the boom 100. This helps to ensure that the nozzle body 10 on the end of the boom 100 does not get out of spray timing with other nozzle bodies 10 located along the length of the boom 100. The engagement of the button 208 with the aperture 113 also helps to maintain the longitudinal placement of the device 202 with respect to the boom 100.

As shown in FIGS. 9A-9C, an alternative embodiment of an air aspiration device 302 can be designed to attach to the boom 100 by having an external surface 317 engage an internal surface 121 of the boom 100 (as shown in FIG. 9C). The air aspiration device 302 can include barbs 323 to help seal the external surface 317 of a main body 312 of the air aspiration device 302 against the internal surface 121 of the boom 100. The air aspiration device 302 can form an internal end cap for an end of the boom 100.

FIGS. 9A-9C illustrate that the air aspiration device 302 can also be used with a dry boom 107. The dry boom 107 can be used to support the nozzle body 10, and thus, indirectly support the wet boom 100 as well. Dry booms 107 can be used in circumstances where more nozzle bodies 10 and/or a longer wet boom 100 are necessary. Although the dry boom 107 is shown in conjunction with a specific embodiment of an air aspiration device 302, a dry boom 107 can be used with any of the embodiments of air aspiration devices as described herein.

FIGS. 10A-10C illustrate another alternative embodiment of an air aspiration device 402 where an external surface 417 of the device 402 engages the internal surface 121 of the boom 100. A main body 412 is attached to a female pipe fitting 410. In this embodiment, a clip 427 can be used to retain the female pipe fitting 410 with respect to the boom 100. The clip 427 passes through a slot 429 in the female pipe fitting 410. As shown in FIG. 10C, gasket 431, such as a rubber o-ring, can be used to help seal the external surface 417 of the air aspiration device 402 against the internal surface 121 of the boom 100.

Figure 11A:
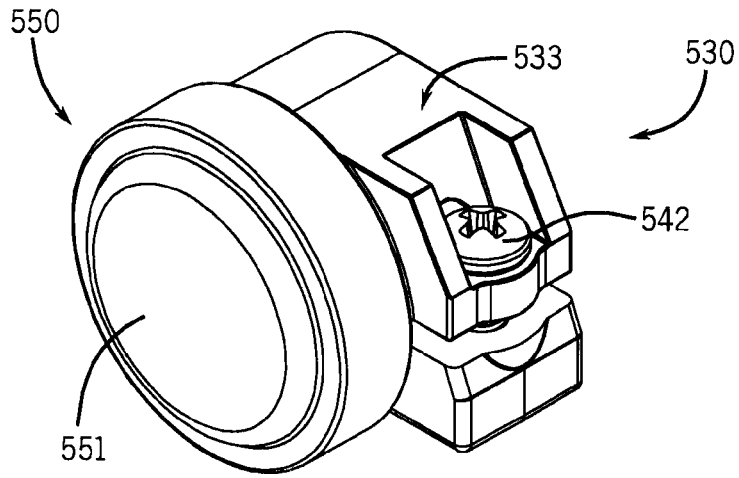
FIG. 11A is a perspective view of a wet boom end cap.
Figure 11B:
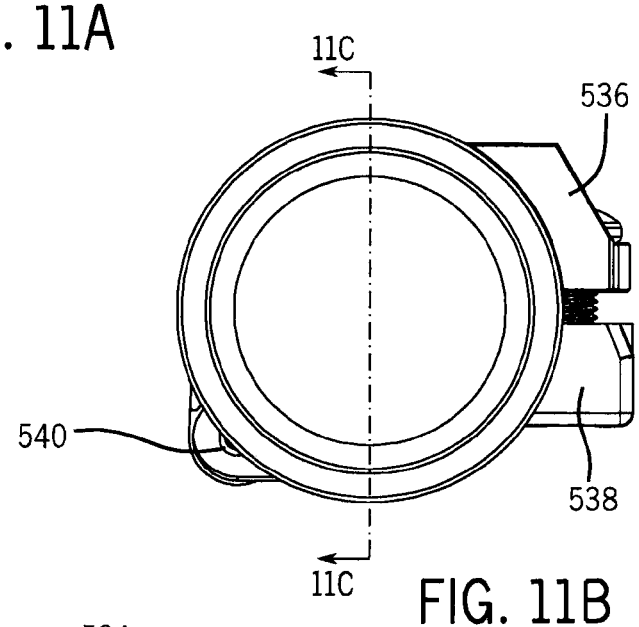
FIG. 11B is side elevational view of the wet boom end cap of FIG. 11A.
Figure 11C:
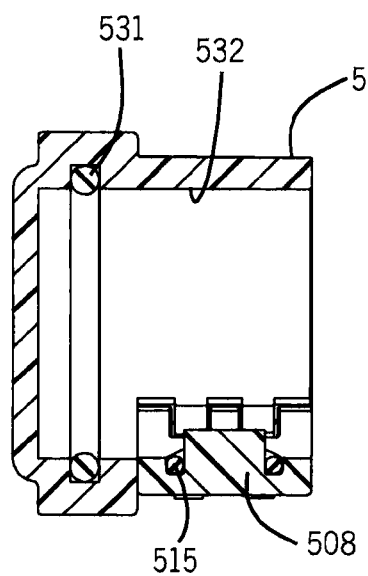
FIG. 11C is a cross sectional view taken along line 11C-11C of FIG. 11B.

FIGS. 11A-11C illustrate an end cap 550 that can be used on an end of a boom 100. The end cap 550 can include a cap portion 551 and a clamp portion 530. The clamp portion 530 of the end cap 550 is similar to the clamp 230 described above and shown in FIGS. 7A-7C. The end cap 550 can include a body portion 533 with an internal surface 532, an external surface 534, a first clamping component 536, and a second clamping component 538. The first and second clamping components 536, 538 can be hinged together with a hinge pin 540 and tightened with a fastener 542. The end cap 550 can also include a button 508 and gaskets 515, 531 to help seal the end cap 550 to the boom 100. The end cap 550 can be useful when an operator chooses to place an air aspiration device on one end of the boom 100, with an end cap 550 on the other end of the boom 100.

FIGS. 12A-12D illustrate another embodiment of an air aspiration assembly 600. The assembly 600 can include an air aspiration device 602 and a removable clamp 660. FIG. 12A illustrates the assembly 600 in an exploded view, and FIG. 12B illustrates the assembly 600 in an assembled condition. The air aspiration device 602 can include a main body 612, a female pipe fitting 610, a recessed portion 614, and an external surface 617. The device 602 can include apertures 616.

The removable clamp 660 can include a body portion 663 with an internal surface 662, an external surface 664, and buttons 608. The clamp 660 can also include a first side 667 and a second side 668. The clamp 660 can include a first clamping component 670 and a second clamping component 672. Each clamp component 670, 672 can include a first flange 674 and a second flange 676 with holes 678 for receiving fasteners 680.

When assembled, the internal surface 662 of the removable clamp 660 is designed to engage an external surface 617 of the air aspiration device 602 (as best shown in FIG. 12A), with the buttons 608 sealingly engaging the apertures 616 in the air aspiration device 602 (as best shown in FIG. 12D). Although a boom 100 is not shown in FIGS. 12A-12D, the buttons 608 can be designed to sealingly engage apertures in the boom, as discussed above. Gaskets 615, such as a rubber o-ring, can be used along with buttons 608 and to help seal the apertures 616 in the air aspiration device 602 to the boom 100. Gaskets 631 also help to seal the device 602 to the boom 100. The removable clamp 660 can fit snugly in the recessed portion 614 of the air aspiration device 602 so that the first side 667 engages a first shoulder 669 of the recessed portion 614 and the second side 668 engages a second shoulder 671 of the recessed portion 614. This engagement helps to prevent the air aspiration device 602 from moving longitudinally with respect to the boom 100.

FIG. 12D illustrates that the air aspiration device 602 can incorporate a drain passage 635. The drain passage 635 is in fluid communication with the solution that is carried by the boom 100 and with the passageway 618 having an exit port 619, and can be located below the air port 606. The drain passage 635 can be sized to be smaller than the air port 606, so that the majority of the solution and the air trapped in the boom 100 are delivered through the passageway 618 by entering at the air port 606. In one embodiment, the drain passage 635 is generally circular and is about 4.5 mm in diameter; however, the drain passage 635 can have other sizes and shapes.

The drain passage 635 can allow an operator to drain the boom 100 at a faster rate. In embodiments where the air aspiration device does not include a drain passage 635, the solution near the end of the boom 100 near the air aspiration device needs to drain from the boom 100 by draining from a more internal nozzle body 10 that siphons solution through an aperture on the bottom of the boom 100. This can result in increased draining times for the boom 100 and, if the boom 100 is not perfectly level, may result in solution collecting near an end of the boom 100 and not fully draining from the boom 100.

FIGS. 13A-13G illustrate another embodiment of the air aspiration device 702 with a removable clamp 660. FIGS. 13A-13G also illustrate an air aspiration device 702 where a female pipe fitting 710 is removable from a main body 712 of the air aspiration device 702. The female pipe fitting 710 can be removed if the boom 100 becomes plugged or clogged.

Figure 13D:
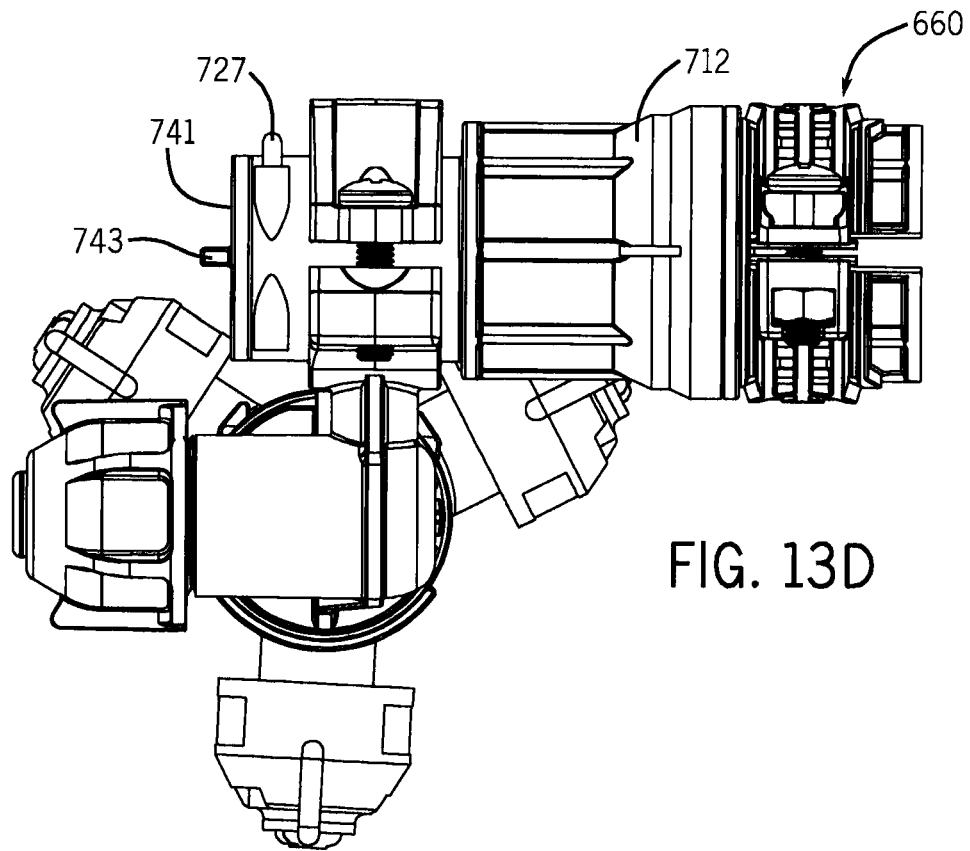
FIG. 13D is a rear view of the air aspirator and clamp assembly of FIG. 13A.
Figure 13E:
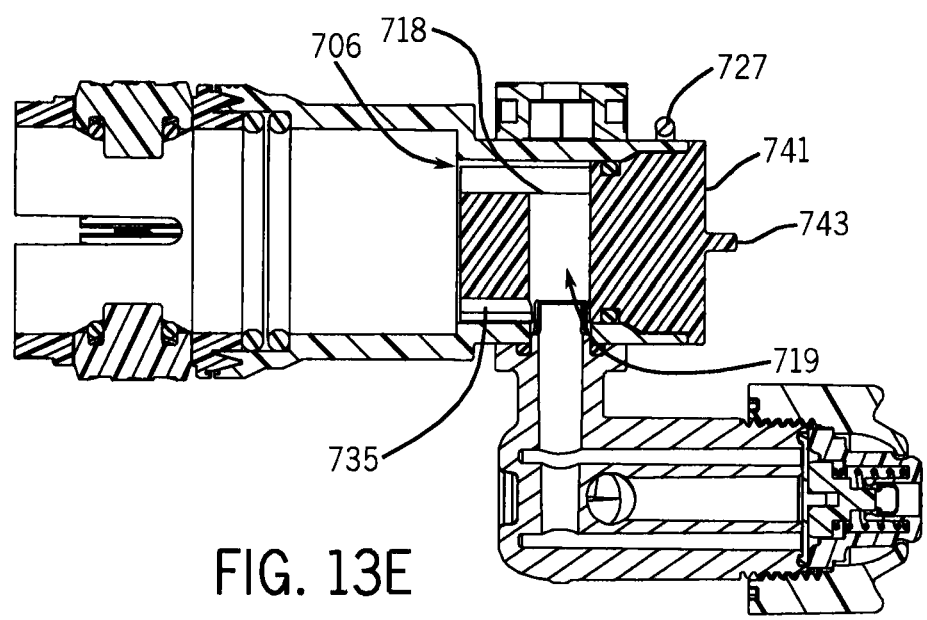
FIG. 13E is a cross sectional view taken along line 13E-13E of FIG. 13C.

The air aspiration device 702 can include a clip 727 that fits within slots 737 in the female pipe fitting 710 and slots 739 in the main body 712 in order to retain the female pipe fitting 710 with respect to the main body 712. If the clip 727 is removed, the female pipe fitting 710 can be removed from the main body 712. FIG. 13B illustrates the female pipe fitting 710 removed from the main body 712. As shown in FIG. 13E, the air aspiration device 702 can also include a passageway 718, an air port 706, an exit port 719, and a drain passage 735.

Figure 13F:
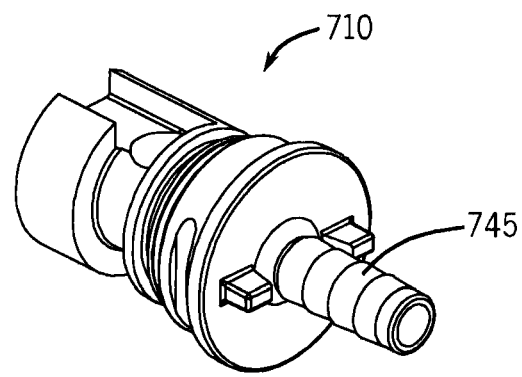
FIG. 13F is a perspective view of an alternative female pipe fitting for the air aspiration device of FIG. 13A.
Figure 13G:
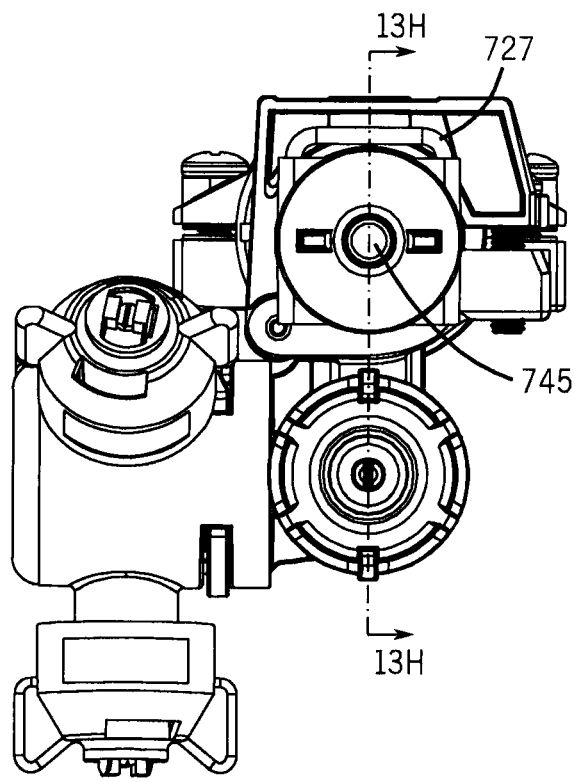
FIG. 13G is a side elevational view of the air aspirator and clamp assembly of FIG. 13A with the female pipe fitting of FIG. 13F.
Figure 13H:
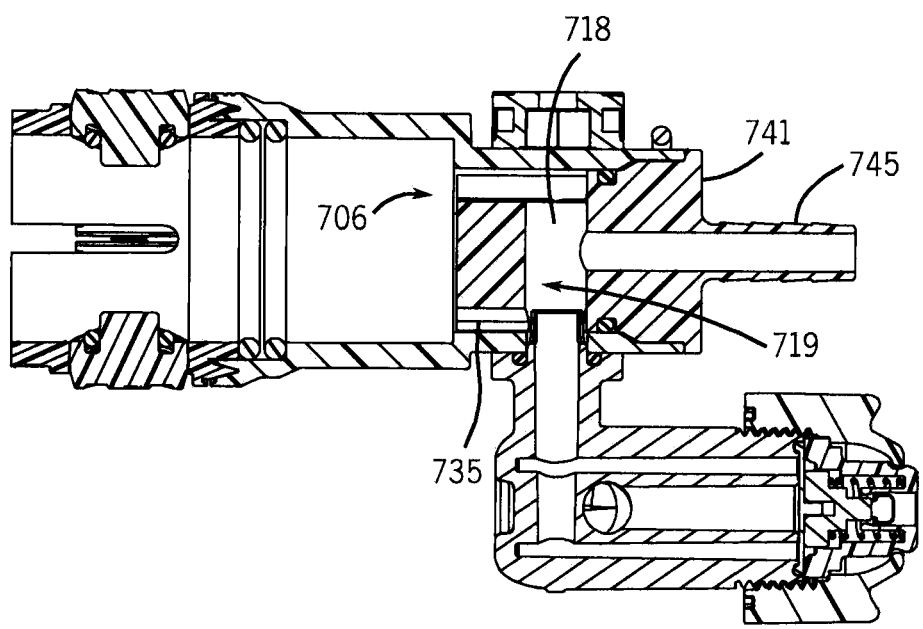
FIG. 13H is a cross sectional view taken along line 13H-13H of FIG. 13G.

The female pipe fitting 710 can include an outer surface 741 with different features. In one embodiment, the female pipe fitting 710 can include an outer surface 741 with a grip 743 as shown in FIGS. 13A-13E. The grip 743 can help a user remove the female pipe fitting 710 from the main body 712 of the air aspiration device 702. In another embodiment, the outer surface 741 can include a hose barb connection 745, as shown in FIGS. 13F-13H. The hose barb connection 745 can be in fluid communication with the passageway 718 and can be used to recycle fluid or provide solution to another nozzle body 10.

Figure 14B:
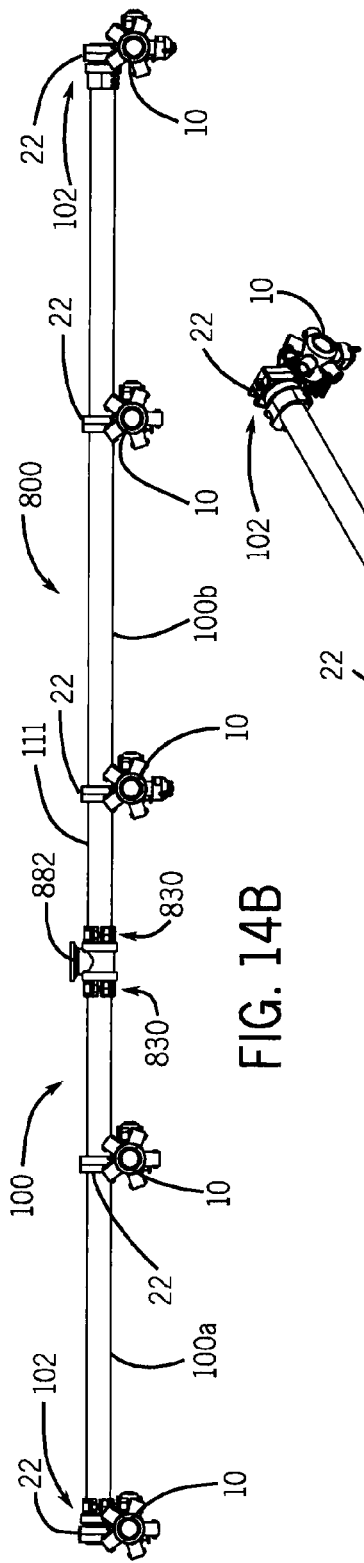
FIG. 14B is a front elevational view of the wet boom of FIG. 14A.
Figure 14A:
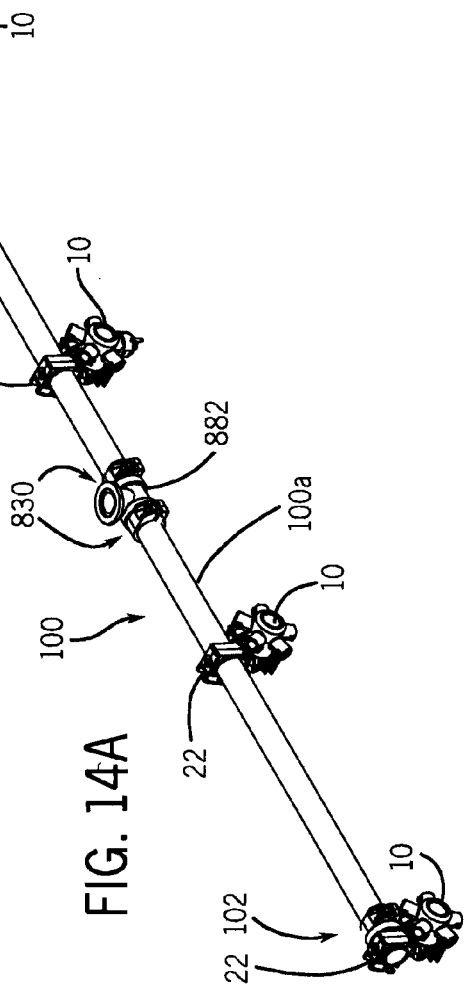
FIG. 14A is a perspective view of a wet boom incorporating two air aspiration devices and clamp assemblies and an integral clamp universal flange tee adapter.

FIGS. 14A and 14B illustrate a fluid delivery system 800. The system 800 can include a boom 100, multiple nozzle bodies 10, pipe clamps 22, and air aspiration devices 102. The boom 100 can include a first section 100a and a second section 100b. The nozzle bodies 10 can be spaced along the boom 100 at regular intervals. The fluid delivery system 800 can also include an integral clamp universal flange tee adapter 882. The tee adapter 882 can be attached to an exterior surface 111 of the boom 100 with the clamps 830 that are integral to the adapter 882. The clamps 830 couple the first section 100a and the second section 100b to the tee adapter 882 and maintain the first section 100a and the second section 100b in rotational alignment, or rotationally timed. In other words, the clamps 830 maintain an angular relationship between the first section 100a and the second section 100b of the boom 100. A fluid source (not shown) can be in fluid communication with the adapter 882. The fluid can flow through the hollow channel of the boom 100 to the nozzle bodies 10 by passing through apertures in the boom 100 for the nozzle bodies 10 that are not on the ends of the boom 100, or through the exit ports in the air aspiration devices 102. Although the fluid delivery system 800 in FIGS. 14A-14C shows an air aspiration device 102 on each end of the boom 100, an air aspiration device 102 need not be on each end of the boom 100 to remove trapped air from the boom 100. Rather, an end cap 550 or other device can be placed on one end of the boom 100. Any of the air aspiration devices discussed herein can be used in the fluid delivery system 800.

Figure 15A:
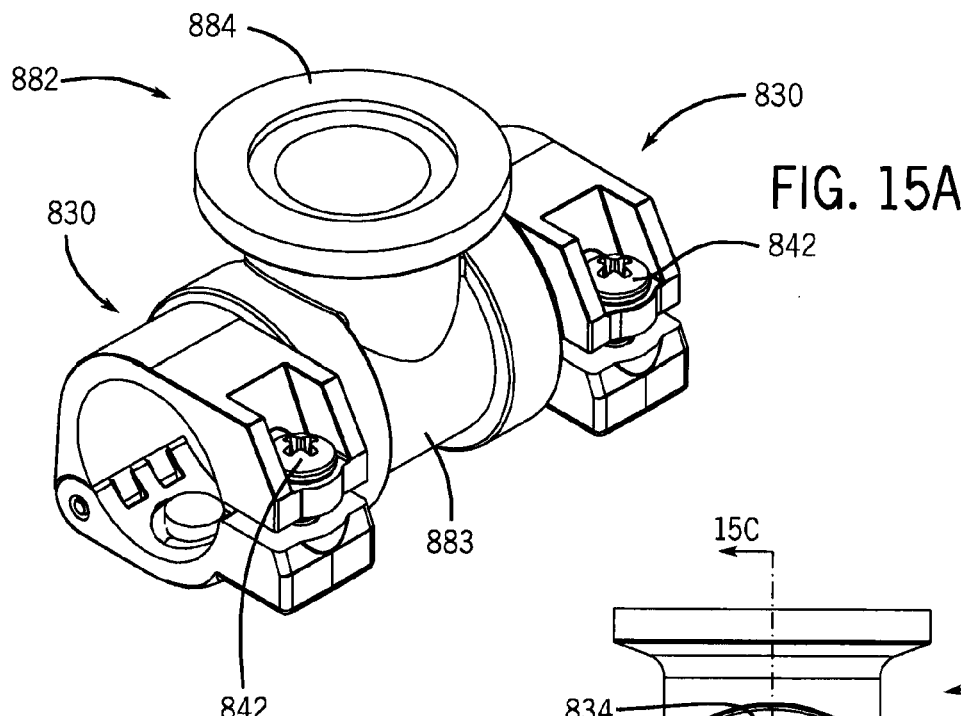
FIG. 15A is a perspective view of a wet boom integral clamp universal flange tee adapter and clamp assembly.
Figure 15B:
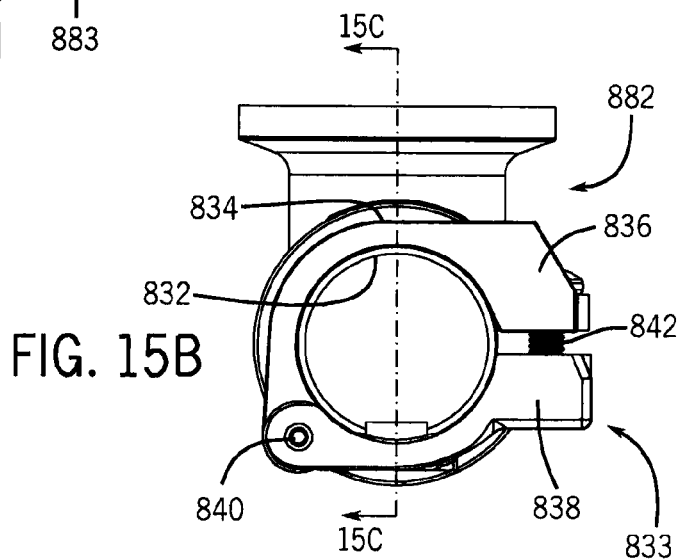
FIG. 15B is a side elevational view of the wet boom integral clamp universal flange tee adapter and clamp assembly of FIG. 15A.
Figure 15C:
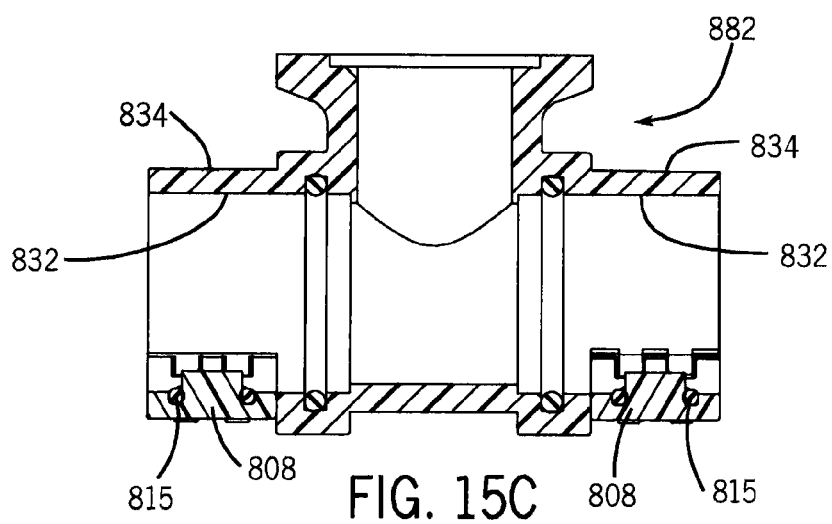
FIG. 15C is a cross sectional view taken along line 15C-15C of FIG. 15B.

FIGS. 15A-15C further illustrate the integral clamp universal flange tee adapter 882 of FIGS. 14A-14C. The adapter 882 can include a main body 883 and a flange 884. The tee adapter 882 can also include two clamps 830 that are integral with the main body 883 of the adapter 882. The clamps 830 are of similar construction to the clamps 230, 530 discussed above with respect to the air aspiration device 202 and end cap 502. The clamps 830 can include buttons 808 that sealingly engage apertures in the boom 100, as described above, and can include gaskets 815. The clamps 830 can include a body portion 833 with an internal surface 832 and an external surface 834. Additionally, the clamps 830 can include a first clamping component 836 and a second clamping component 838 that are hinged together with a hinge pin 840. Fasteners 842 can be used to tighten the internal surfaces 832 of the clamps 830 against an exterior surface of a boom when attaching the tee adapter 882 to the boom, as discussed above for FIGS. 14A and 14B.

FIGS. 16A-16E illustrates other types of adapters that can be incorporated into the fluid delivery system 800 with removable clamps 660. For example, the fluid delivery system 800 can include a universal flange tee adapter 886, a universal flange adapter 888, and a camlock adapter 890 each attached to the boom 100 with removable clamps 660. The removable clamps 660 can couple the universal flange tee adapter 886 to the first section 100a of the boom 100 and to the second section 100b of the boom 100 in order to maintain an angular relationship between the first section 100a and the second section 100b. Adapters 886, 888, 890 are further shown in FIGS. 17F, 17E, and 17B, respectively. FIGS. 16A-16E also illustrate apertures 113 in the boom where nozzle bodies may be attached to be in fluid communication with the boom 100.

Figure 17A:
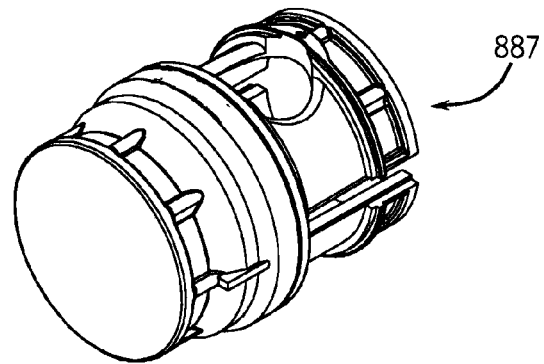
FIG. 17A is a perspective view of a blank adapter.
Figure 17B:
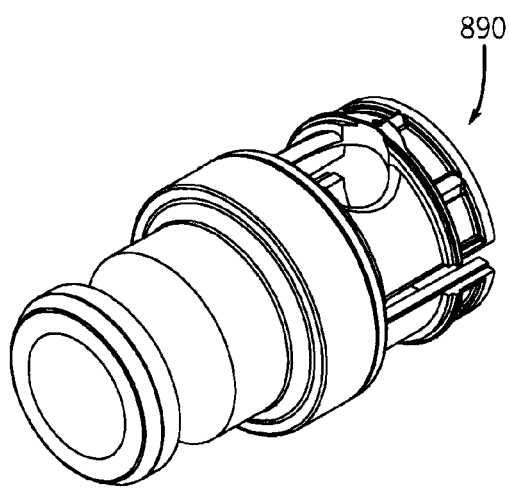
FIG. 17B is a perspective view of a camlock adapter.
Figure 17C:
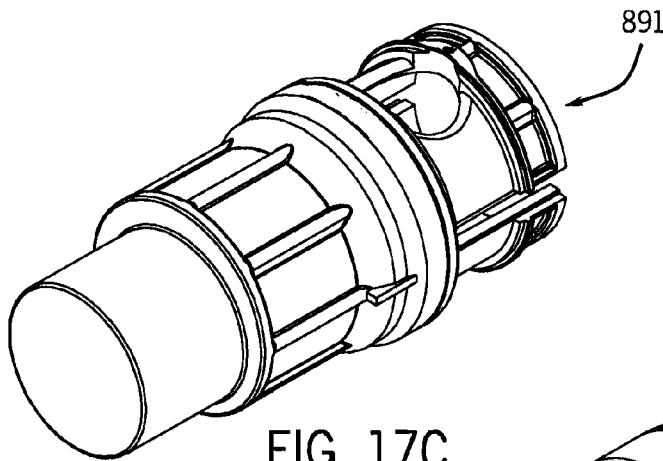
FIG. 17C is a perspective view of a nozzle body end cap adapter.
Figure 17D:
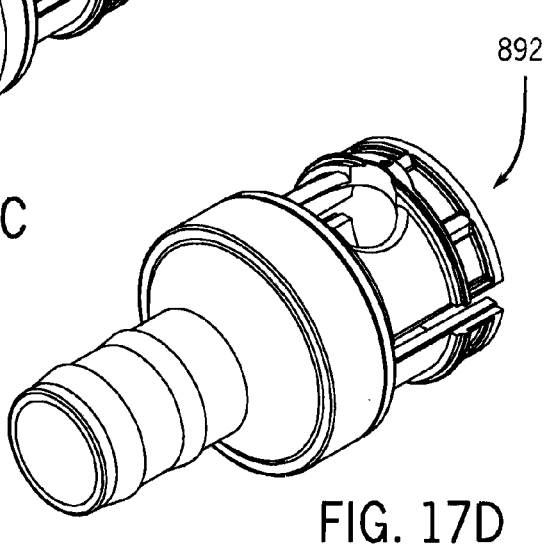
FIG. 17D is a perspective view of an hose barb adapter.
Figure 17E:
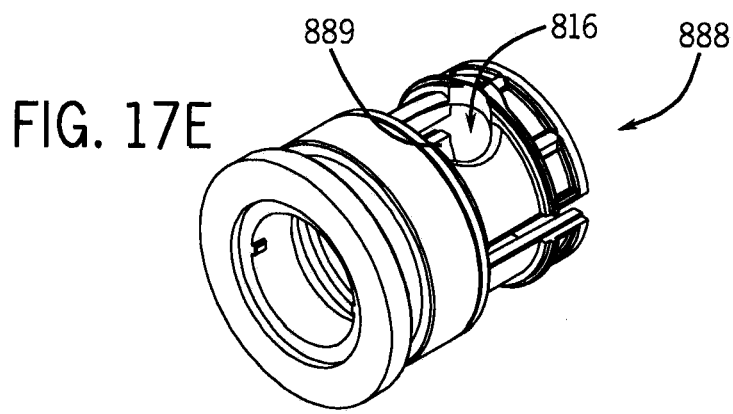
FIG. 17E is a perspective view of a universal flange adapter.
Figure 17F:
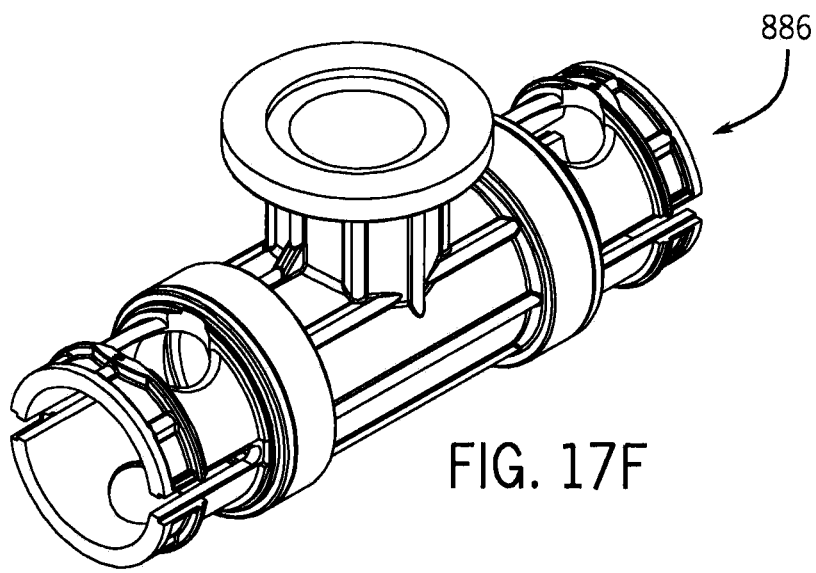
FIG. 17F is a perspective view of a universal flange tee adapter.
Figure 17G:
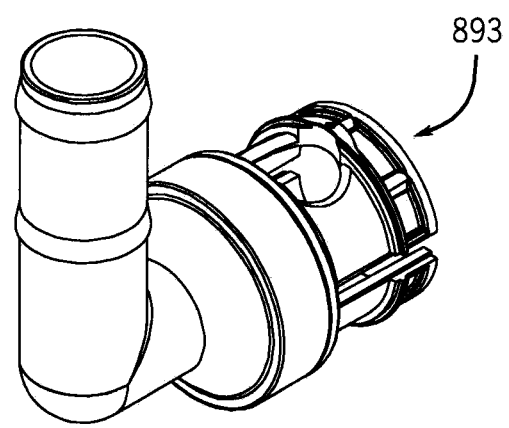
FIG. 17G is a perspective view of a 90° hose barb adapter.

The fluid delivery system 800 can also be configured to incorporate one or more of the other adapters shown in FIGS. 17A-17G. FIG. 17A illustrates a blank adapter 887, FIG. 17C illustrates a nozzle body end cap adapter 891, FIG. 17D illustrates a hose barb (HB) adapter 892, and FIG. 17G illustrates a 90° hose barb (HB) adapter 893. The fluid delivery system 800 can also be configured to incorporate adapters of a similar nature.

The adapters shown in FIGS. 17A-17G can attach to the boom 100 in a similar manner with one or more removable clamps 660. FIGS. 16B and 16C illustrate how the universal flange adapter 888 of FIG. 17E is attached to a boom 100. The adapter 888 can include an internal surface 889 that slides over the external surface 111 of the boom 100. One or more apertures 816 in the adapter 888 align with apertures 113 in the boom 100. The clamping components 670, 672 can be placed in a recessed portion 814 of the adapter 888 that includes apertures 816. The clamping components 670, 672 can be placed within the recessed portion 814 so that the buttons 608 align with the apertures 816 of the adapter 888 and the apertures 113 in the boom 100. Fasteners 680 can tighten the two clamping components 670, 672 together and the buttons 608 of the clamp 660 then sealingly engage the apertures 816 of the adapter 888 and the apertures 113 in the boom 100. The adapter 888 can also include a first shoulder 869 that engages the first side 667 of the clamp 660 and a second shoulder 871 that engages a second side 671 of the clamp 660. This engagement ensures that the adapter 888 maintains its position with respect to the boom 100 longitudinally and angularly.

All of the adapters shown in FIGS. 17A-17G, and other similar adapters, can be attached to the boom 100 with a removable clamp 660 in a similar fashion to that as described above with respect to the adapter 888.

Figure 18A:
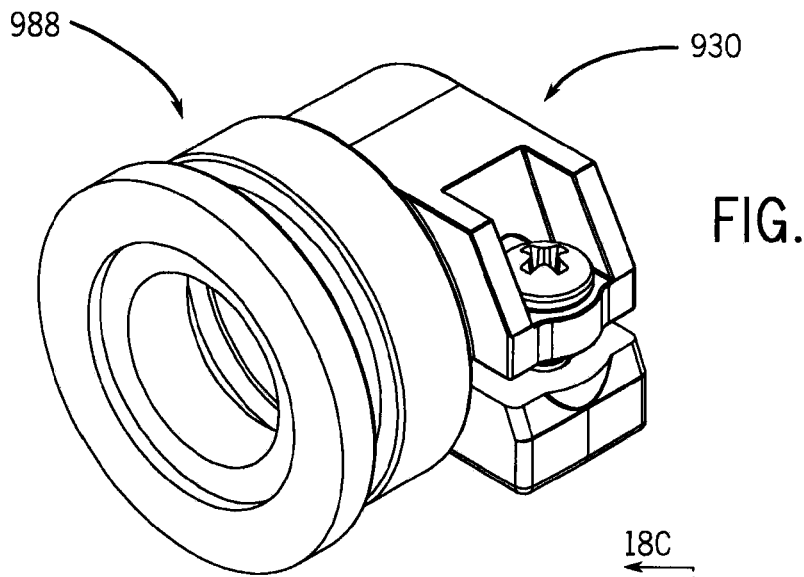
FIG. 18A is a perspective view of a wet boom universal flange adapter with an integral clamp.
Figure 18B:
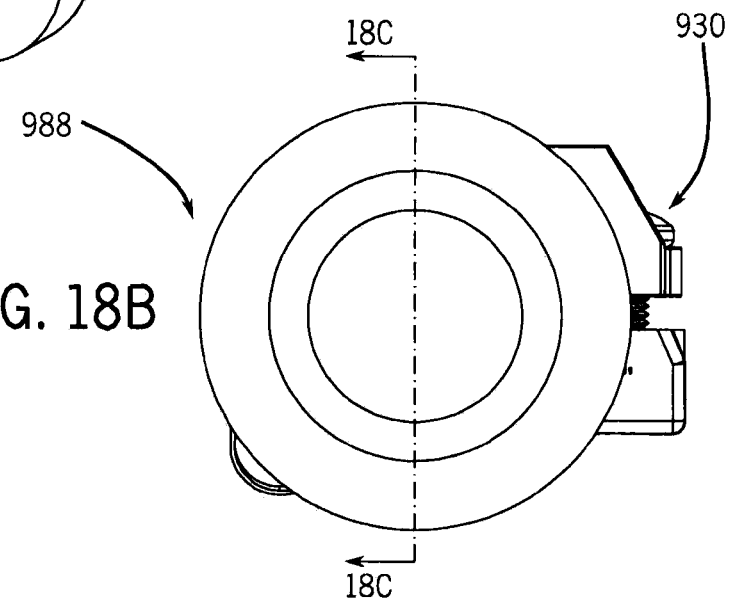
FIG. 18B is a side elevational view of the wet boom universal flange adapter of FIG. 18A.
Figure 18C:
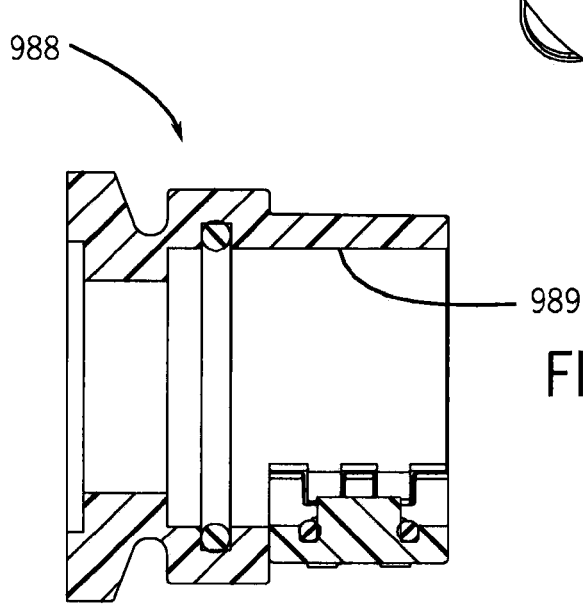
FIG. 18C is a cross sectional view taken along line 18C-18C of FIG. 18B.

Alternatively, the adapters shown in FIGS. 17A-17G, and other similar adapters, can be configured with an integral clamp for attaching the adapters to the boom 100. One such example already discussed above is the universal flange tee adapter 882 shown in FIGS. 15A-15C. Another example is the universal flange adapter 988 shown in FIGS. 18A-18C. Similar to the adapter 888 discussed above, the adapter 988 can include an internal surface 989 for engaging the external surface 111 of the boom 100. The adapter 988 includes an integral clamp 930, similar to the integral clamps 230, 530, and 830 discussed above. The integral clamp 930 provides another way to attach the adapters to the boom to maintain the adapters in a fixed longitudinal and angular position with respect to the boom.

The air aspiration devices described above provide several advantages for fluid delivery systems 800. By siphoning solution from a point higher than the bottom of the boom 100, the air aspiration devices reduce the amount of air that can be trapped in the boom 100. The air can also become mixed in the solution due to the turbulent flow caused by the passageway in the air aspiration devices altering the path of the solution and air as they flow from the boom 100 to the feed spigot 20 of the nozzle body 10.

Figure 19:
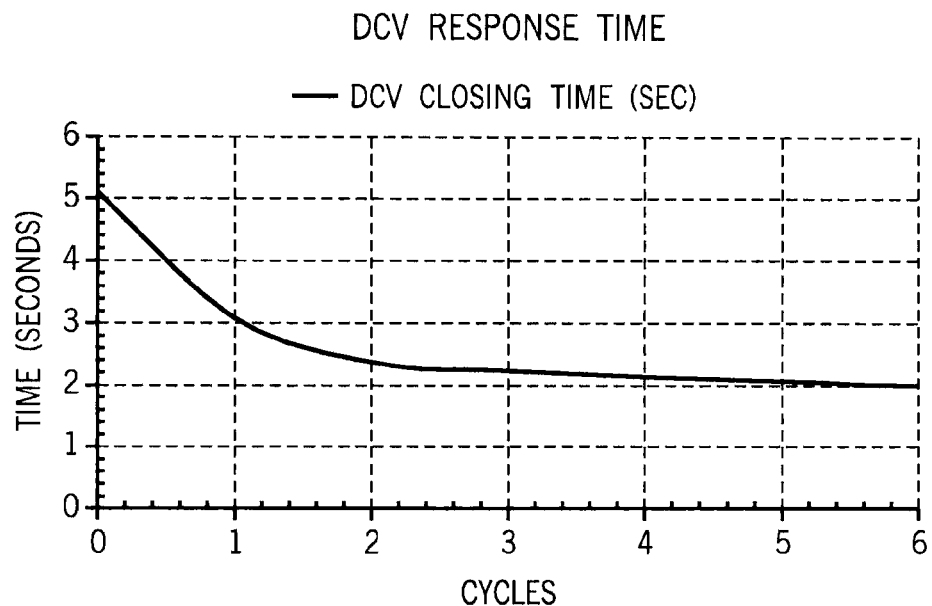
FIG. 19 is a graph showing the diaphragm check valve response time for a number of cycles for a wet boom pipe in an air saturated condition where no new air is introduced into the wet boom.
Figure 20:
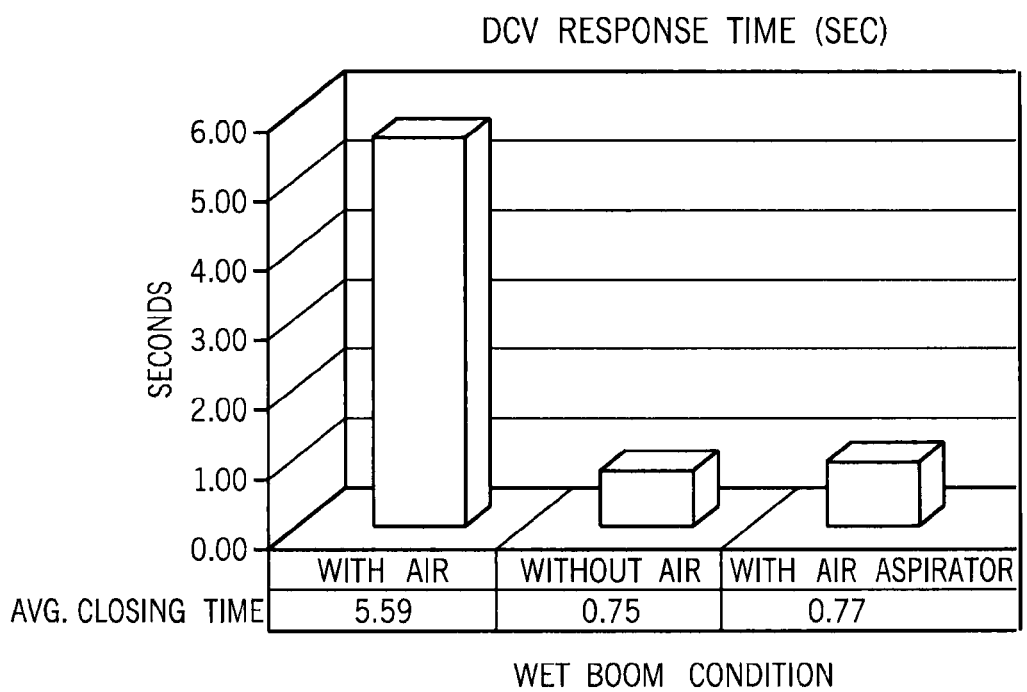
FIG. 20 is a bar graph illustrating test data shutoff performance for nozzle body diaphragm check valves for a wet boom that includes an air aspiration device embodying the invention versus a wet boom saturated with air and a wet boom purged of air.
Figure 21:
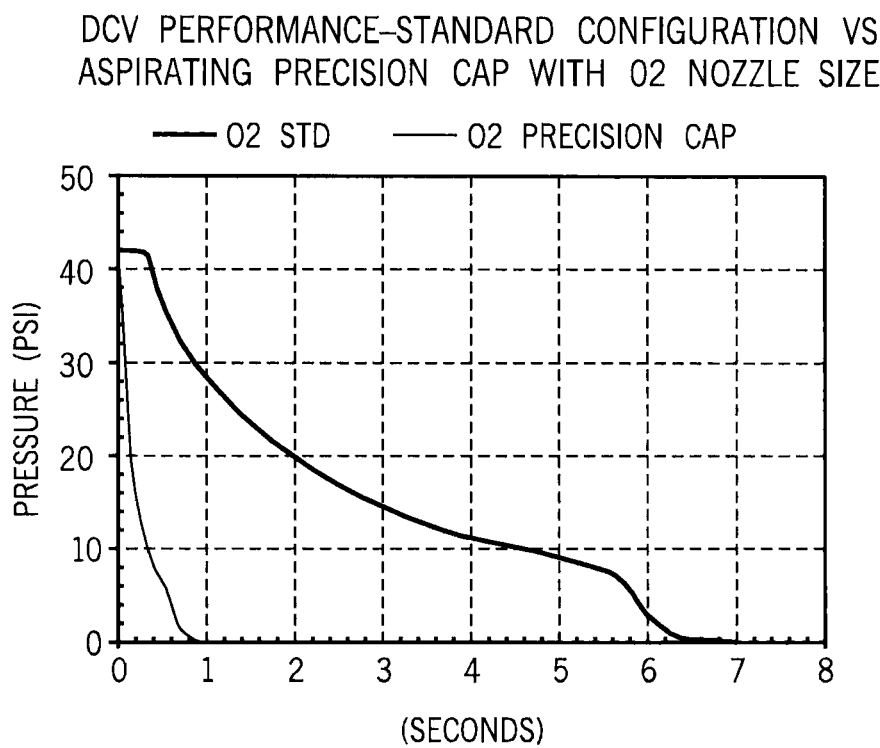
FIG. 21 is a graph showing the diaphragm check valve performance for a standard boom configuration versus a boom configuration with an air aspirating device.

The air aspiration devices also reduce the shut-off time of the diaphragm check valve 18. This results in less solution being dispersed that is not intended to be dispersed by the fluid delivery system 800. The air aspiration devices reduce the amount of air trapped in the boom 100 and reduce the pressure in the boom 100. Therefore, when the fluid delivery system 800 is shut off, the pressure in the boom is only slightly above the shut-off pressure of the check valve 18 in the nozzle body 10. This reduction in pressure of air in the boom 100 also helps reduce pressure variation among the nozzle bodies 10 along the length of the boom 100, which results in a more even application of solution to the targeted application. FIGS. 19-21 help illustrate the magnitude of the reduction of the response time for check valves 18 in a fluid delivery system 800 that employs an air aspiration device according to embodiments of the invention.

FIG. 19 is a graph illustrating the diaphragm check valve 18 response time for a nozzle body 10 shown as the number of cycles versus time for the response of the diaphragm check valve 18 with the wet boom pipe 100 in an air saturation condition. If no new air is introduced, after about six cycles, the response time for the check valve 18 to shut off is reduced from over about five seconds to about two seconds. Thus, for a system 800 not employing an air aspiration device, the response time of the check valve 18 is only lowered after several cycles.

FIG. 20 is a bar graph illustrating shut-off performance test data of diaphragm check valves 18 in a fluid delivery system using an air aspiration device, versus a wet boom pipe without an air aspiration device, in a boom with air and a boom without air. As shown in the bar graph, the response time of the diaphragm check valve 18 of the fluid delivery system without an air aspiration device in a wet boom pipe with trapped air was significantly higher (5.59 seconds) than the other two scenarios. The response time for the fluid delivery system with an air aspiration device was very similar to the response time of a fluid delivery system without an air aspiration device but having a wet boom completely saturated with fluid.

FIG. 21 is a graph illustrating diaphragm check valve performance by comparing the response time for check valves for a fluid delivery system incorporating an air aspiration device to the response time for check valves for a system without an air aspiration device. The response time for the diaphragm check valves for the two systems was checked at different pressures. As shown by the graph, the fluid delivery system with the air aspiration device recorded much shorter response times than the system without the air aspiration device, especially at lower pressures.

Additionally, the air aspiration devices are a passive system that require no electronics or power. As such, the air aspiration devices provide a consistent and robust system for reducing the amount of trapped air in a boom.

The air aspiration devices can be manufactured from materials including, but not limited to, polypropylene and polyoxymethylene.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

The invention claimed is:

1. An air aspiration device to release trapped air in a pipe when delivering a solution to a nozzle body, the nozzle body including a feed spigot, the air aspiration device comprising:
   a main body that engages the pipe;
   a female pipe fitting coupled to the main body, the female pipe fitting forming an end cap for one end of the pipe and engaging the feed spigot;
   an air port positioned asymmetrically toward a top portion of the main body and the pipe in the female pipe fitting that is in fluid communication with the solution and the air;
   a passageway through the female pipe fitting that is in fluid communication with the air port, the passageway delivering both the solution and the air to the feed spigot; and
   an exit port in the female pipe fitting that is in fluid communication with the passageway, the feed spigot engaging the exit port.

2. The air aspiration device of claim 1, wherein the main body is integral with the female pipe fitting.

3. The air aspiration device of claim 1, wherein the passageway alters the direction of the solution and the air between the air port and the exit port.

4. The air aspiration device of claim 3, wherein the passageway forms a right angle between the air port and the exit port.

5. The air aspiration device of claim 1, and further comprising a drain passage in fluid communication with the solution in the pipe and in fluid communication with the passageway, the drain passage being located below the air port.

6. The air aspiration device of claim 5, wherein the drain passage is sized so that a majority of the solution and the air enter the passageway at the air port.

7. The air aspiration device of claim 1, wherein an exterior surface of the air aspiration device engages an interior surface of the pipe.

8. The air aspiration device of claim 7, wherein the exterior surface is on the female pipe fitting.

9. The air aspiration device of claim 1, wherein the female pipe fitting is removable from the main body.

10. The air aspiration device of claim 1, wherein an outer surface of the female pipe fitting includes a hose barb connection.

11. The air aspiration device of claim 1, wherein the female pipe fitting includes a slot that receives a clip in order to retain the female pipe fitting.

12. The air aspiration device of claim 1, wherein an interior surface of the air aspiration device engages an exterior surface of the pipe.

13. The air aspiration device of claim 1, wherein the main body includes a recessed portion, a first shoulder, and a second shoulder, the first shoulder being on an opposite side of the recessed portion from the second shoulder.

14. The air aspiration device of claim 13, wherein the recessed portion includes a first aperture and the pipe includes a second aperture, the first aperture and the second aperture receiving a first button of a removable clamp to maintain an angular relationship between the air aspiration device and the pipe.

15. The air aspiration device of claim 14, wherein the recessed portion includes a third aperture and the pipe includes a fourth aperture, the third aperture and the fourth aperture receiving a second button of the removable clamp to further maintain the angular relationship between the air aspiration device and the pipe.

16. The air aspiration device of claim 14, wherein the first shoulder engages a first side of the removable clamp and the second shoulder engages a second side of the removable clamp.

17. The air aspiration device of claim 1, wherein the main body further includes an integral clamp with an interior surface and an exterior surface, the interior surface engaging an outer surface of the pipe.

18. The air aspiration device of claim 17, wherein the interior surface includes a button and the pipe includes an aperture, the button received by the aperture when the air aspiration device is clamped to the pipe in order to maintain an angular orientation between the air aspiration device and the pipe.

19. The air aspiration device of claim 1, wherein the pipe is an agricultural boom.

20. The air aspiration device of claim 1, wherein the solution is an agricultural chemical.

21. The air aspiration device of claim 1, wherein the nozzle body receives at least three spray nozzles.

22. An air aspirator assembly to release air trapped in a pipe when delivering a solution to a nozzle body, the nozzle body including a feed spigot, the pipe including an aperture, the assembly comprising:
- a main body that engages the pipe;
- a female pipe fitting that engages the feed spigot, the female pipe fitting including an air port, a passageway, and an exit port,
  - the air port in fluid communication with the solution and the air,
  - the passageway in fluid communication with the air port, the passageway delivering both the solution and the air to the feed spigot,
  - the exit port in fluid communication with the passageway, the feed spigot engaging the exit port; and
- a clamp including a body portion having an internal surface with a button, the button engaging the aperture in the pipe in order to maintain an angular orientation between the main body and the pipe.

23. The assembly of claim 22, wherein the clamp is integral with the main body.

24. The assembly of claim 22, wherein the female pipe fitting forms an end cap for one end of the pipe.

25. The assembly of claim 22, wherein the main body includes a second aperture and the clamp is removable from the main body, the button engaging the second aperture in addition to the aperture in the pipe in order to maintain the angular orientation between the main body and the pipe.

26. The assembly of claim 25, wherein the main body includes a recessed portion, a first shoulder, and a second shoulder, the first shoulder being on an opposite side of the recessed portion from the second shoulder.

27. The assembly of claim 26, wherein the first shoulder engages a first side of the clamp and the second shoulder engages a second side of the clamp.

28. The assembly of claim 22, and further comprising a gasket engaging the button to create a seal between the button and the aperture.

29. The assembly of claim 28, wherein the internal surface of the clamp includes a second button, the main body includes a third aperture and the pipe includes a fourth aperture, the second button engaging the third aperture and the fourth aperture to further maintain the angular orientation between the main body and the pipe.

30. The assembly of claim 29, and further comprising a second gasket engaging the second button to create a seal between the second button and the third aperture and the fourth aperture.

31. An air aspiration device to release trapped air in a pipe when delivering a solution to a nozzle body, the nozzle body including a feed spigot, the air aspiration device comprising:
- a main body that engages the pipe;
- a female pipe fitting coupled to the main body, the female pipe fitting forming an end cap for one end of the pipe and engaging the feed spigot;
- an air port in the female pipe fitting that is in fluid communication with the solution and the air;
- a passageway through the female pipe fitting that is in fluid communication with the air port, the passageway delivering both the solution and the air to the feed spigot;
- an exit port in the female pipe fitting that is in fluid communication with the passageway, the feed spigot engaging the exit port; and
- a drain passage in fluid communication with the solution in the pipe and in fluid communication with the passageway, the drain passage being located below the air port.

32. The air aspiration device of claim 31, wherein the drain passage is sized so that a majority of the solution and the air enter the passageway at the air port.

33. An air aspiration device to release trapped air in a pipe when delivering a solution to a nozzle body, the nozzle body including a feed spigot, the air aspiration device comprising:
- a main body that engages the pipe;
- a female pipe fitting coupled to the main body, the female pipe fitting forming an end cap for one end of the pipe and engaging the feed spigot;
- an air port in the female pipe fitting that is in fluid communication with the solution and the air;
- a passageway through the female pipe fitting that is in fluid communication with the air port, the passageway delivering both the solution and the air to the feed spigot; and
- an exit port in the female pipe fitting that is in fluid communication with the passageway, the feed spigot engaging the exit port;
- wherein the female pipe fitting includes a slot that receives a clip in order to retain the female pipe fitting.

34. An air aspiration device to release trapped air in a pipe when delivering a solution to a nozzle body, the nozzle body including a feed spigot, the air aspiration device comprising:
- a main body that engages the pipe;
- a female pipe fitting coupled to the main body, the female pipe fitting forming an end cap for one end of the pipe and engaging the feed spigot;
- an air port in the female pipe fitting that is in fluid communication with the solution and the air;
- a passageway through the female pipe fitting that is in fluid communication with the air port, the passageway delivering both the solution and the air to the feed spigot;
- an exit port in the female pipe fitting that is in fluid communication with the passageway, the feed spigot engaging the exit port; and
- wherein the main body includes a recessed portion, a first shoulder, and a second shoulder, the first shoulder being on an opposite side of the recessed portion from the second shoulder.

* * * * *